US011927979B2

(12) United States Patent
Asano et al.

(10) Patent No.: US 11,927,979 B2
(45) Date of Patent: *Mar. 12, 2024

(54) MULTI-DIRECTIONAL INPUT DEVICE

(71) Applicant: Hosiden Corporation, Yao (JP)

(72) Inventors: Mitsuhiro Asano, Yao (JP); Masato Shimizu, Yao (JP)

(73) Assignee: HOSIDEN CORPORATION, Yao (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/877,016

(22) Filed: Jul. 29, 2022

(65) Prior Publication Data
US 2023/0034823 A1 Feb. 2, 2023

(30) Foreign Application Priority Data

Aug. 2, 2021 (JP) ................................ 2021-126436
May 20, 2022 (JP) ................................ 2022-083102
May 20, 2022 (JP) ................................ 2022-083104

(51) Int. Cl.
G05G 9/047 (2006.01)
G01B 7/30 (2006.01)
G05G 5/05 (2006.01)

(52) U.S. Cl.
CPC ............... G05G 9/047 (2013.01); G01B 7/30 (2013.01); G05G 5/05 (2013.01); G05G 2009/04755 (2013.01); G05G 2009/04777 (2013.01); G05G 2009/04781 (2013.01); G05G 2505/00 (2013.01)

(58) Field of Classification Search
CPC .......................................... G05G 2009/04711
See application file for complete search history.

(56) References Cited

U.S. PATENT DOCUMENTS

| 6,266,046 B1* | 7/2001 | Arita | G05G 9/047 |
| | | | 345/157 |
| 6,479,987 B1* | 11/2002 | Marx | G01D 5/145 |
| | | | 324/207.2 |
| 10,203,717 B2* | 2/2019 | Olsson | G06F 3/0338 |
| 11,755,169 B2* | 9/2023 | Asano | G05G 9/047 |
| | | | 345/156 |
| 2006/0028184 A1* | 2/2006 | Lewis | G05G 9/047 |
| | | | 322/3 |

(Continued)

FOREIGN PATENT DOCUMENTS

| JP | 4159576 B2 | 10/2008 |
| JP | 2020-107178 | 7/2020 |

Primary Examiner — Charles A Fox
Assistant Examiner — Gregory T Prather
(74) Attorney, Agent, or Firm — Rankin, Hill & Clark LLP

(57) ABSTRACT

A multi-directional input device includes an operating member that protrudes from a case and can be tilted, a compression coil spring that returns the operating member to an initial state before a tilting operation, a magnet holding member that is relatively movable with respect to the operating member only in a direction along a protruding direction and is interlocked only in a tilting direction, a magnet arranged in the magnet holding portion, and magnetic sensors that are each disposed at a position facing the magnet and detect a movement of the magnet. The magnetic sensors are each disposed on a side of the magnet and can detect magnetic components in three axial directions orthogonal to one another.

16 Claims, 23 Drawing Sheets

(56) References Cited

U.S. PATENT DOCUMENTS

| | | | |
|---|---|---|---|
| 2009/0267594 A1* | 10/2009 | Kather | G01B 7/30 |
| | | | 324/207.25 |
| 2018/0046063 A1* | 2/2018 | Sharma | G02B 7/08 |
| 2020/0033120 A1* | 1/2020 | Huang | G01S 7/481 |
| 2020/0209908 A1 | 7/2020 | Arita et al. | |

* cited by examiner

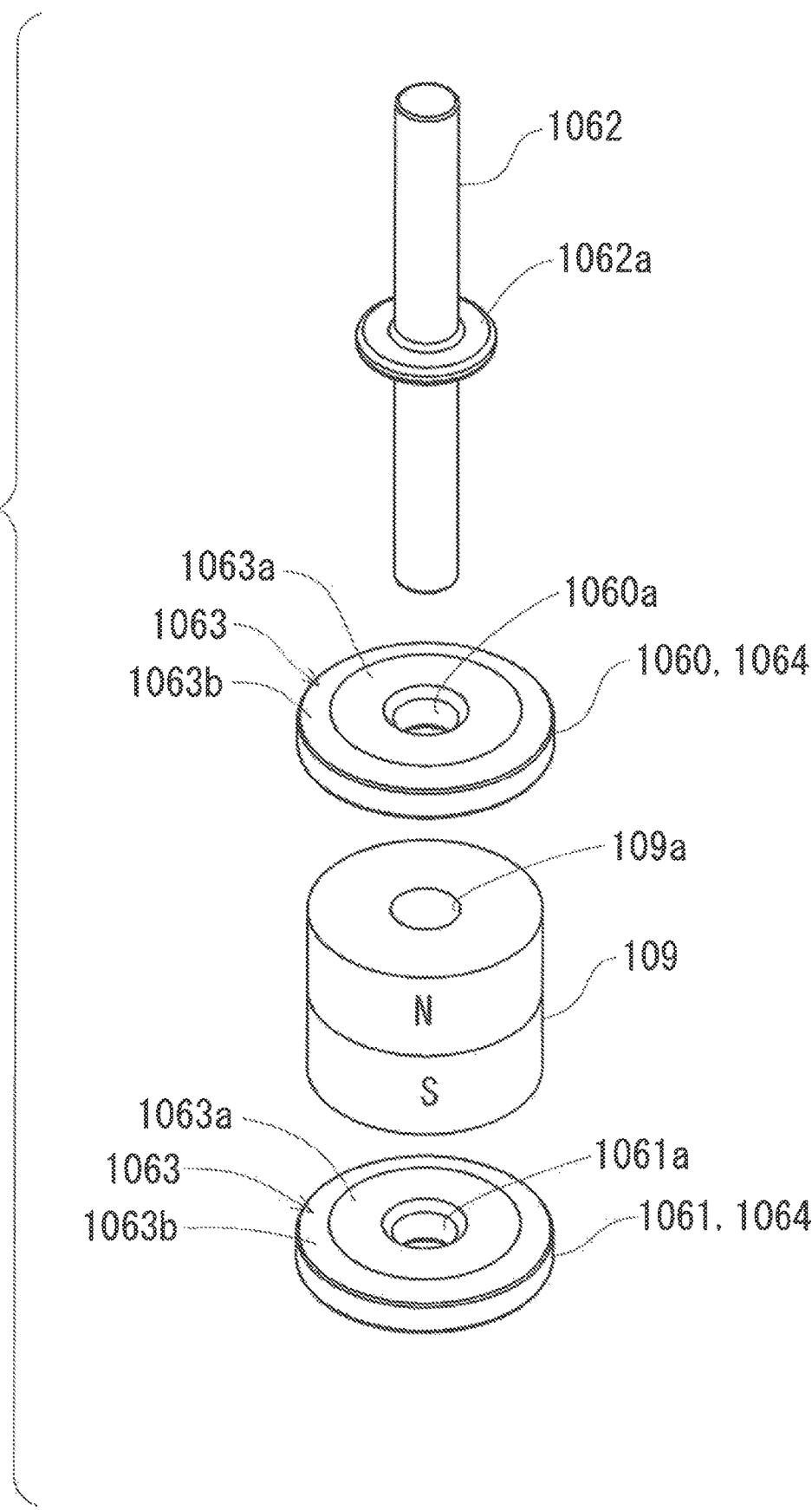

MULTI-DIRECTIONAL INPUT DEVICE

BACKGROUND OF THE INVENTION

(1) Field of the Invention

The present invention relates to a multi-directional input device.

(2) Description of Related Art

Conventionally, there has been known a multi-directional input device including an operating member that can be tilted, an elastic member that returns the operating member to an initial state before a tilting operation, a magnet embedded in a lower end portion of the operating member, and a plurality of magnetoelectric conversion elements disposed below the operating member that detect a magnetic field of the magnet displaced according to the tilting operation of the operating member (see, for example, JP 2020-107178 A).

SUMMARY OF THE INVENTION

In the conventional multi-directional input device, there is a problem that the distance between the magnet and the magnetoelectric conversion elements needs to be minimized due to a reduction in height of a product, so that minute rattling of the magnet is generated, which adversely affects the detection of the tilting operation of the operating member.

An object of the present invention is to provide a multi-directional input device capable of improving detection accuracy of tilting operation of an operating member while trying to reduce the height of the product.

A multi-directional input device according to the present invention includes: a case; an operating member that protrudes from the case and can be tilted; an elastic member that returns the operating member to an initial state before a tilting operation; a magnet holding member that is relatively movable with respect to the operating member only in a direction along a protruding direction and is interlocked with the operating member only in a tilting direction; a magnet held by the magnet holding member; and a magnetic sensor that is arranged at a position facing the magnet and detects a movement of the magnet. The magnetic sensor is disposed on a side of the magnet and can detect magnetic components in three axial directions orthogonal to one another.

BRIEF DESCRIPTION OF THE DRAWINGS

FIG. 10 is an exploded perspective view of the magnet holding portion;

FIGS. 11A and 11B are views illustrating a disk-shaped component, in which FIG. 11A is a plan view and FIG. 11B is a front view of one side cross section;

FIGS. 23A and 23B are views illustrating a cylindrical component, in which FIG. 23A is a one-side cross-sectional plan view and FIG. 23B is a one-side cross-sectional front view.

DETAILED DESCRIPTION OF PREFERRED EMBODIMENTS

Hereinafter, a multi-directional input device (hereinafter, simply referred to as a multi-directional input device) according to an embodiment of the present invention will be described with reference to the drawings.

Figure 1:
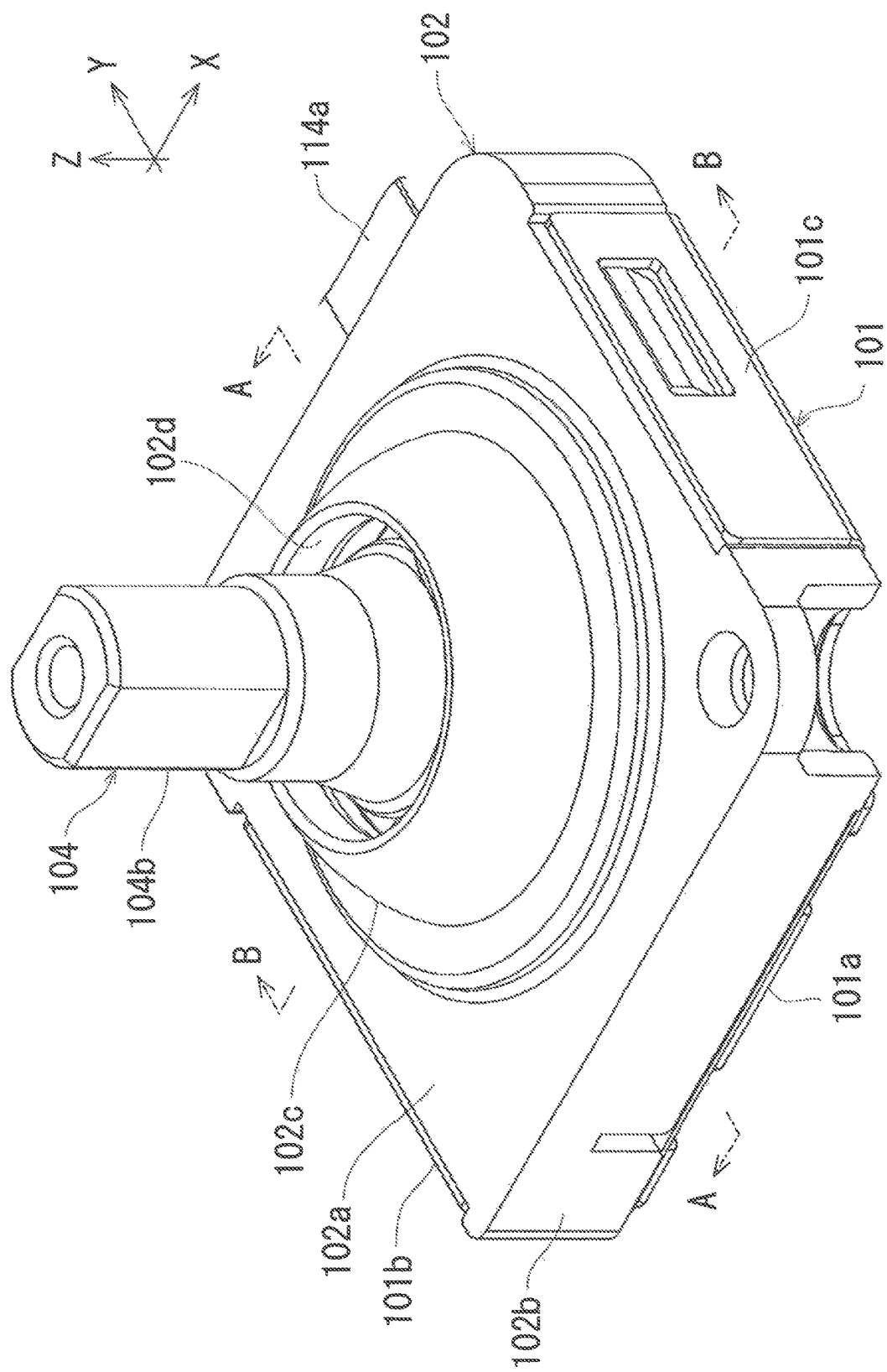
FIG. 1 is a perspective view illustrating a multi-directional input device according to an embodiment of the present invention in an initial state in which an operating force is not applied to an operating member.
Figure 2:
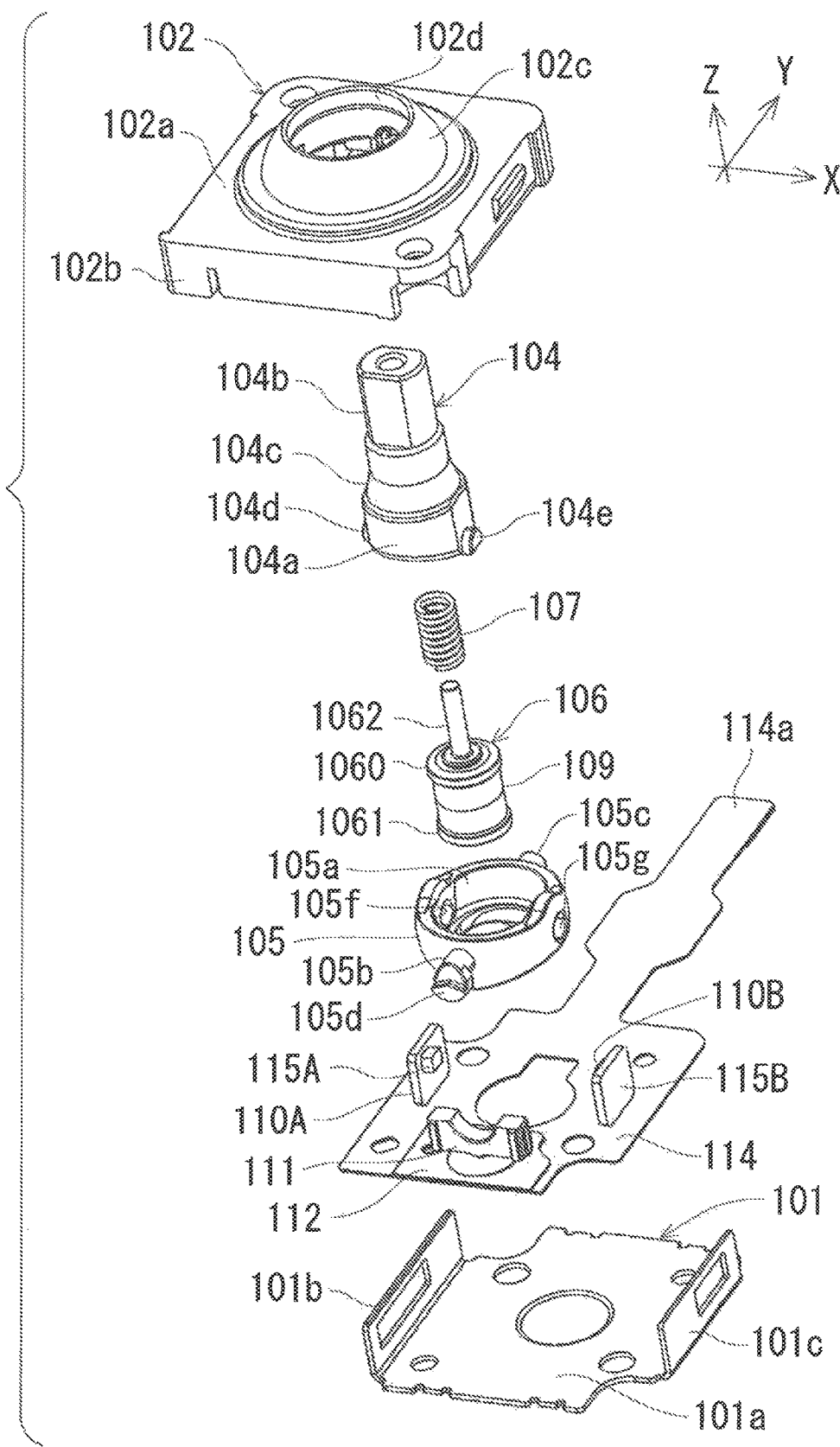
FIG. 2 is an exploded front perspective view of the multi-directional input device in FIG. 1.
Figure 3:
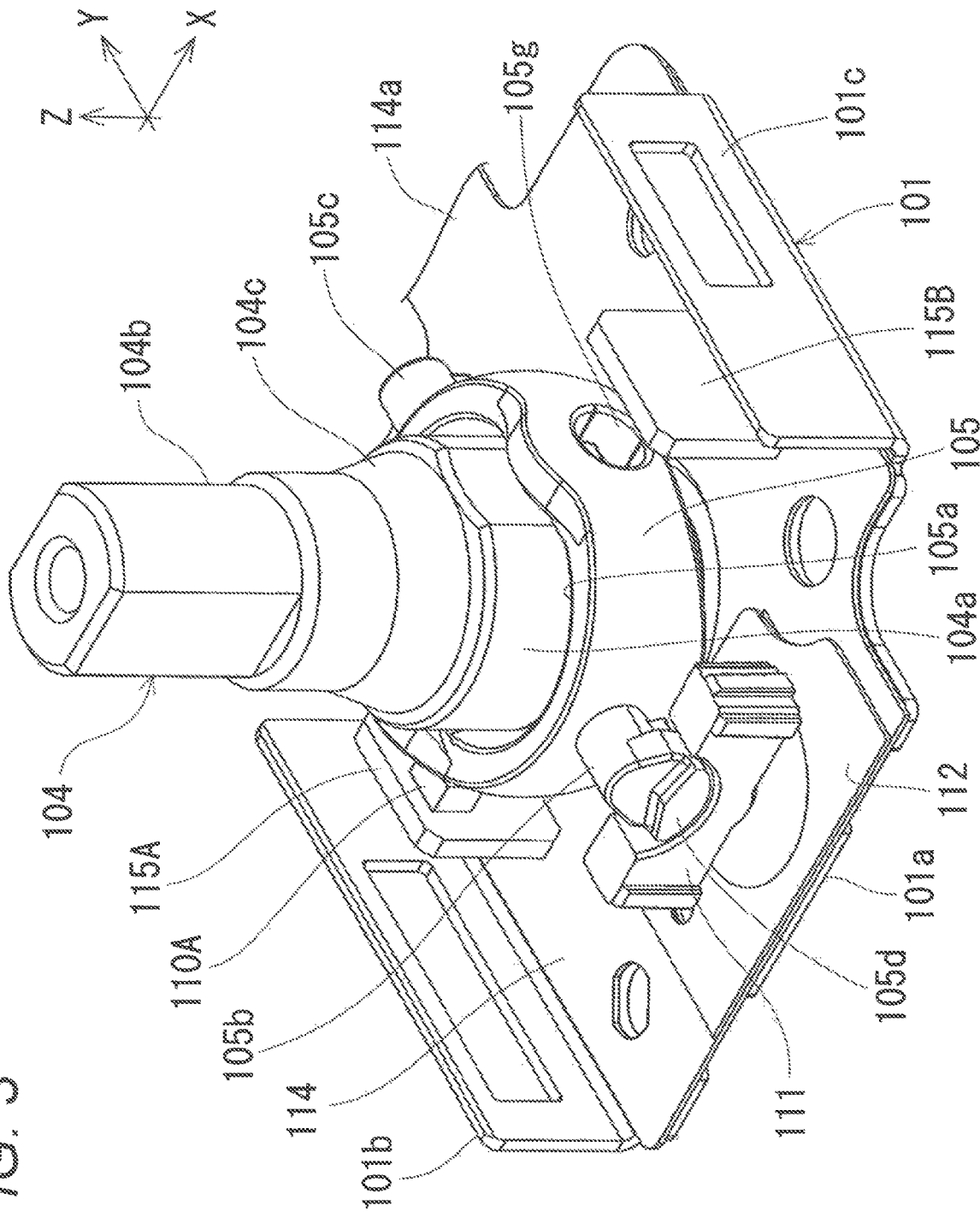
FIG. 3 is a front perspective view of the multi-directional input device in FIG. 1 in a state where an upper cover is transparent.
Figure 4:
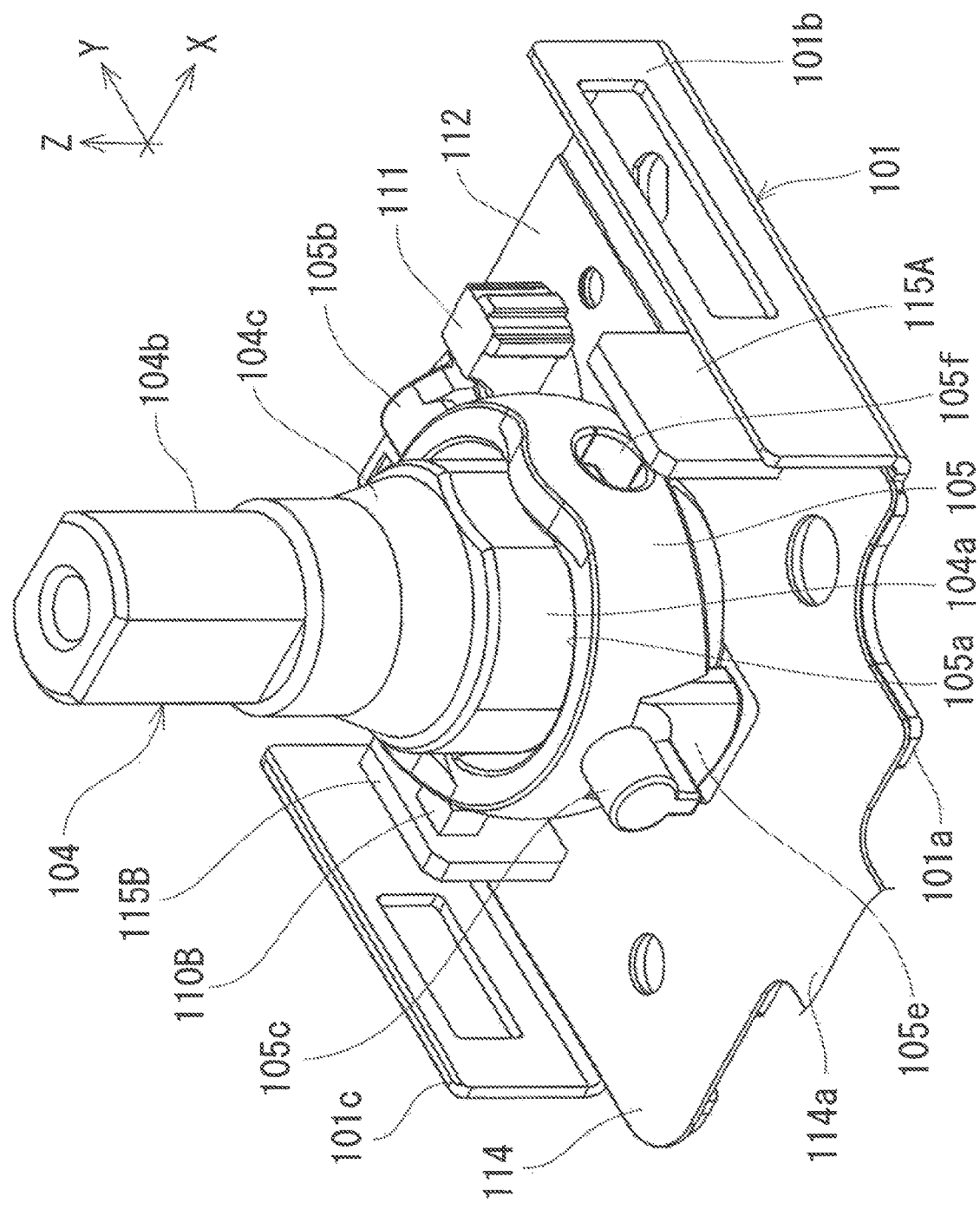
FIG. 4 is a rear perspective view of the multi-directional input device in FIG. 1 in a state where the upper cover is transparent.
Figure 5:
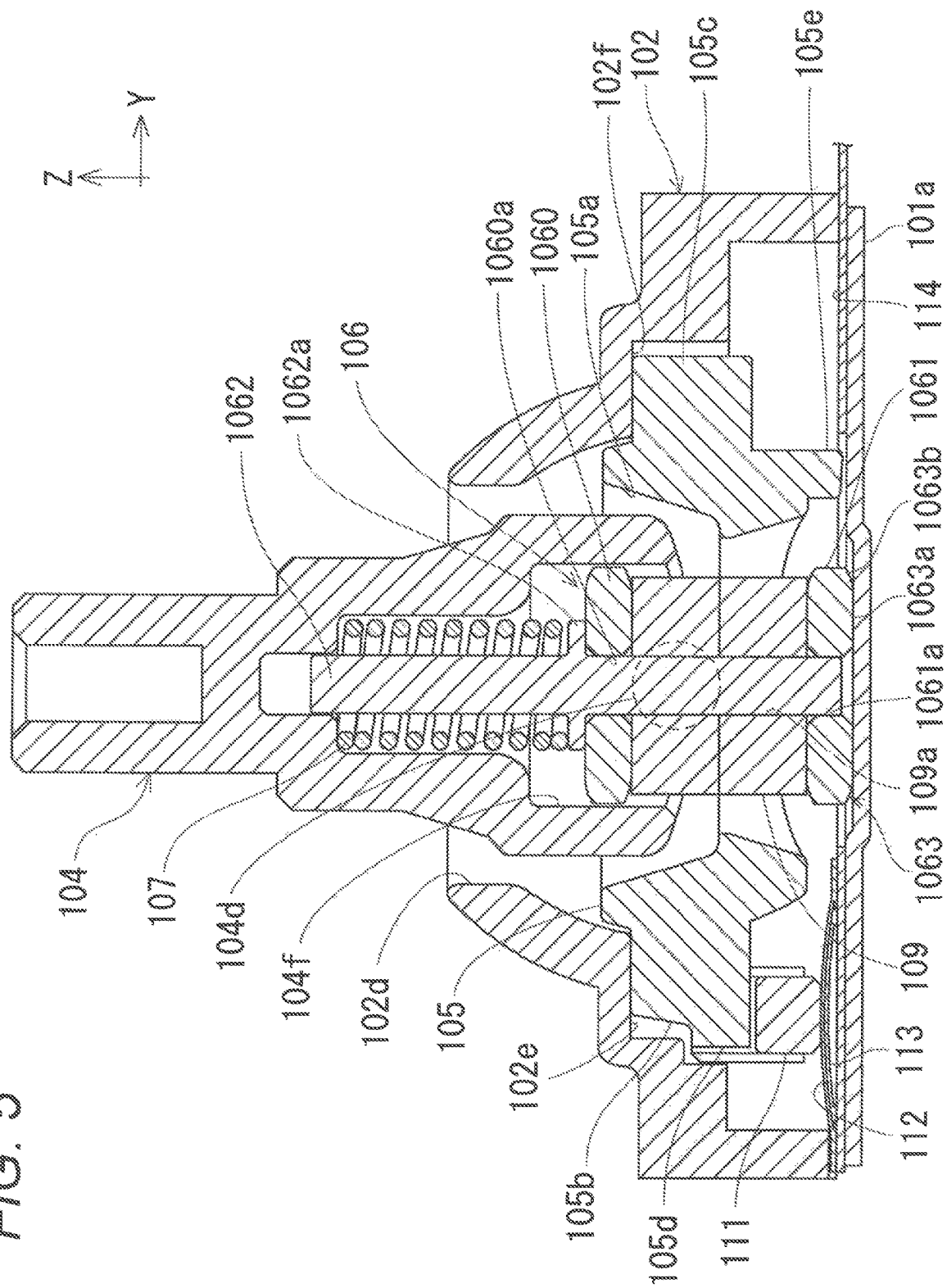
FIG. 5 is a cross-sectional view taken along line A-A of FIG. 1.
Figure 6:
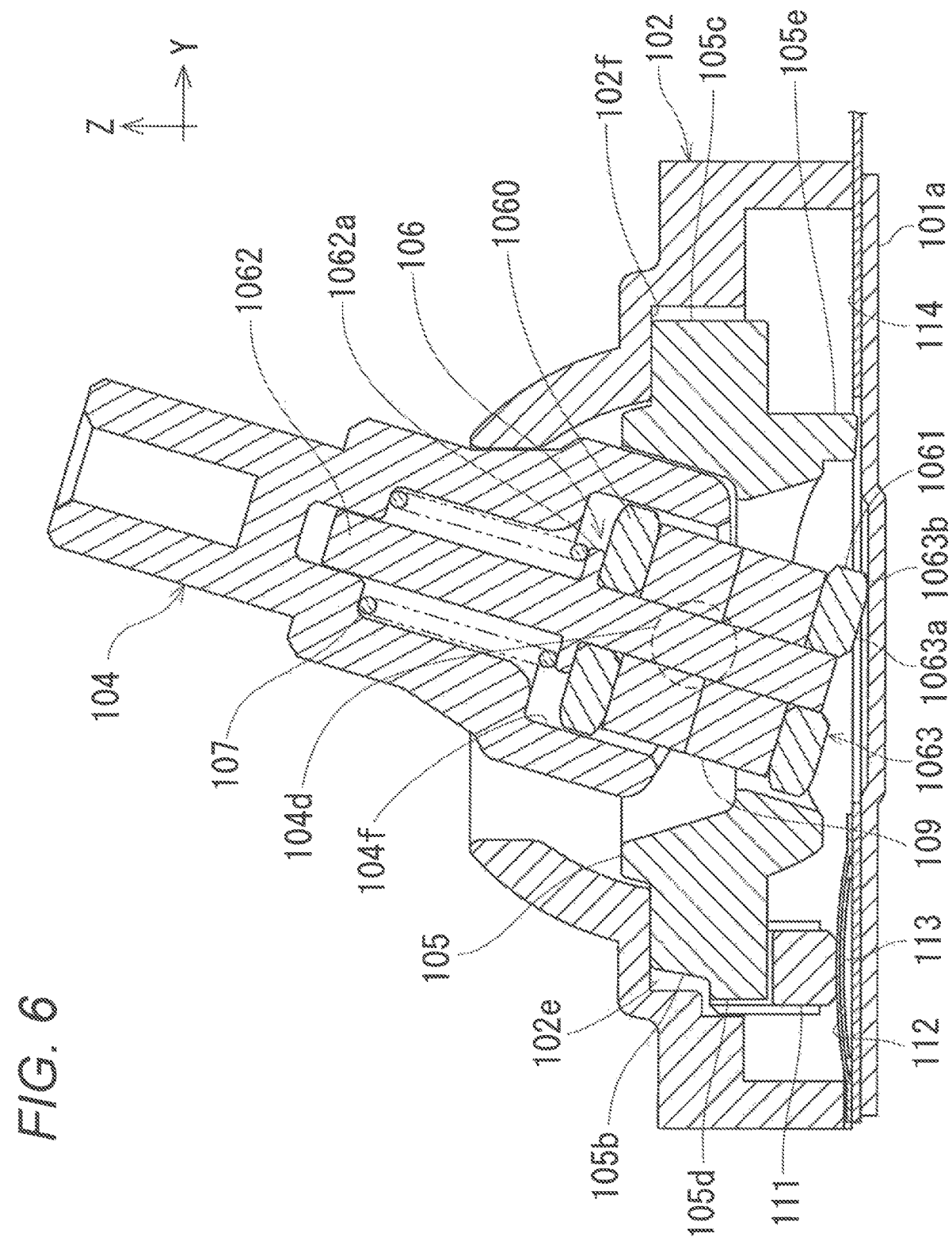
FIG. 6 is a cross-sectional view taken along line A-A of FIG. 1 in a state where the operating member is tilted in a YZ plane direction.
Figure 7:
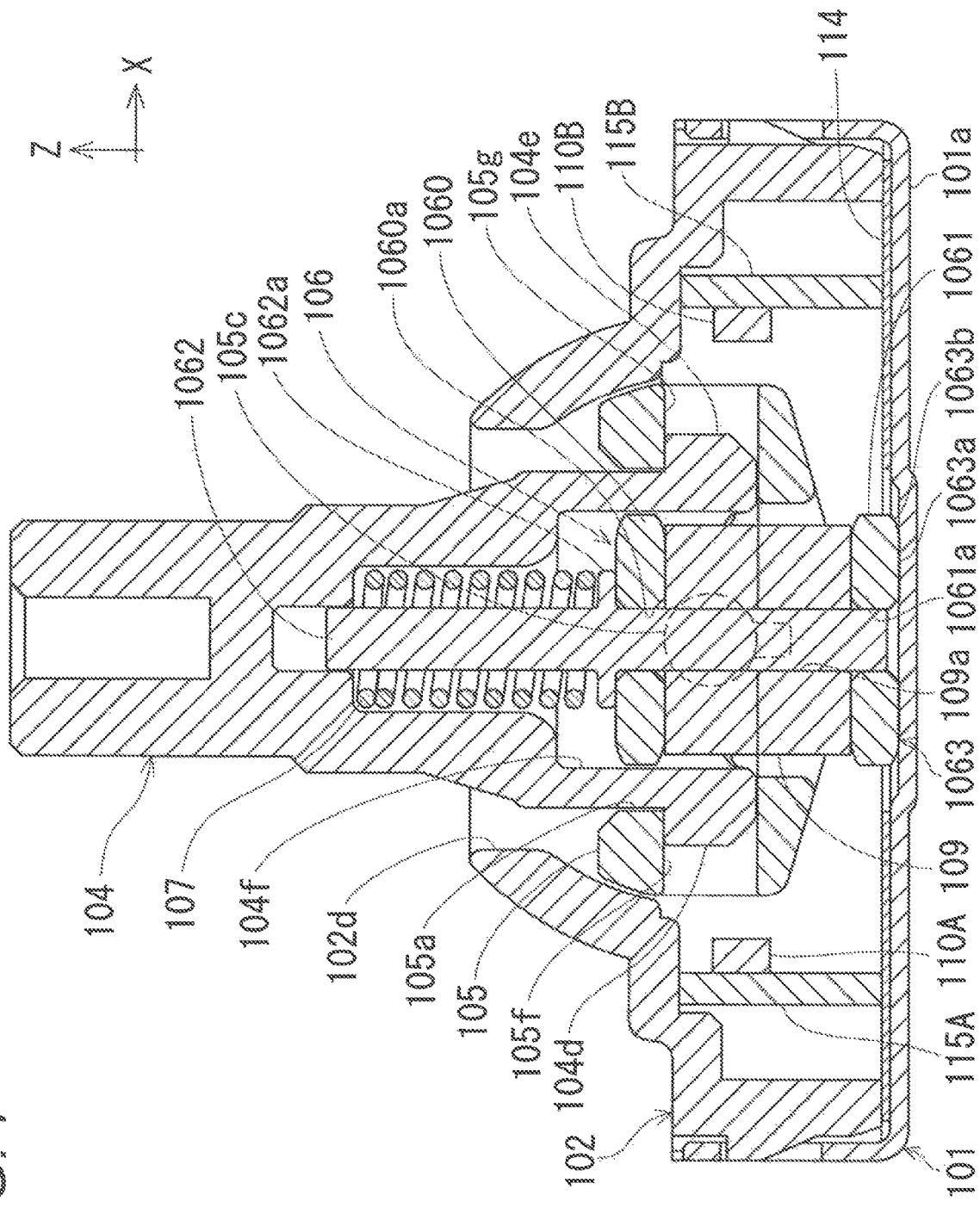
FIG. 7 is a cross-sectional view taken along line B-B of FIG. 1.
Figure 8:
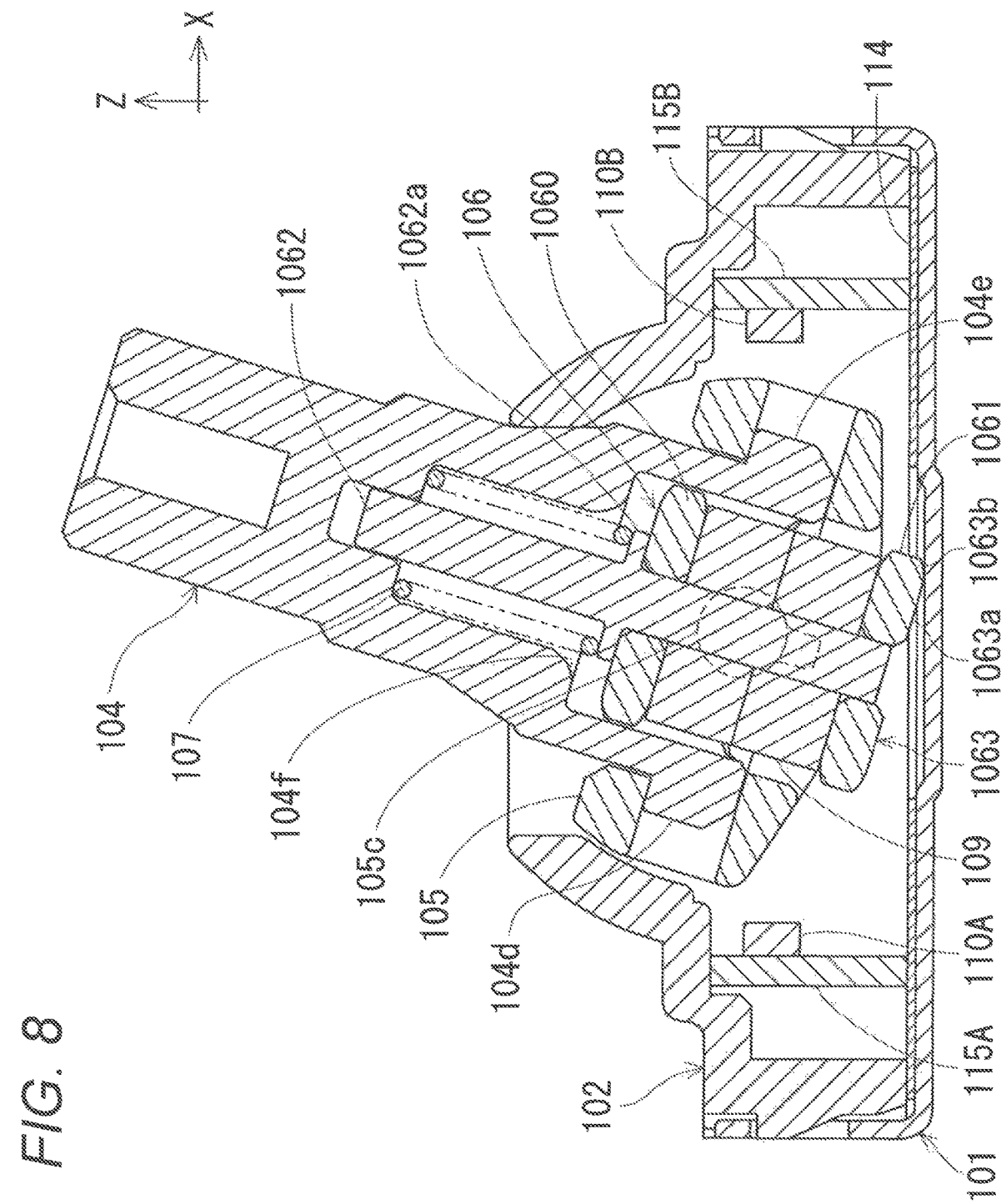
FIG. 8 is a cross-sectional view taken along line B-B of FIG. 1 in a state where the operating member is tilted in an XZ plane direction.

FIG. 1 illustrates a relationship between a multi-directional input device and a three-dimensional space formed by three orthogonal axes (X axis, Y axis, Z axis). A left-right direction of the multi-directional input device is an X-axis direction, a front-back direction of the multi-directional input device orthogonal to the X-axis is a Y-axis direction, and a vertical direction of the multi-directional input device orthogonal to each of the X-axis and the Y-axis is a Z-axis direction.

A direction toward the right side of the multi-directional input device is a positive direction (+X-axis direction) of the X axis, a direction toward the front side of the multi-directional input device is a positive direction (+Y-axis direction) of the Y axis, and a direction toward the upper side of the multi-directional input device is a positive direction (+Z-axis direction) of the Z axis.

A two-dimensional plane formed between the X axis and the Y axis is an XY plane, a two-dimensional plane formed between the X axis and the Z axis is an XZ plane, and a two-dimensional plane formed between the Y axis and the Z axis is a YZ plane.

The multi-directional input device can be used for various electronic devices such as a game machine controller.

As illustrated in FIGS. 1 to 8, the multi-directional input device includes a lower case 101, an upper case 102, an operating member 104, a rotating member 105, a magnet holding portion 106, a compression coil spring 107, a magnet 109, a first magnetic sensor 110A, a second magnetic sensor 110B, a pusher 111, a cover sheet 112, a metal dome 113, a main substrate 114, a first sub-substrate 115A, and a second sub-substrate 115B.

The lower case 101 and the upper case 102 are combined to form a rectangular box shape case. Various components 104, 105, 106, 107, 109, 110A, 110B, 111, 112, 113, 114, 115A, and 115B of the multi-directional input device are accommodated in the case.

The lower case 101 is made of sheet metal. The lower case 101 includes a bottom plate portion 101a and left and right-side plate portions 101b and 101c. The bottom plate portion 101a is formed in a rectangular shape. The left and right-side plate portions 101b and 101c are raised from left and right sides of the bottom plate portion 101a.

The upper case 102 is a resin molded article. The upper case 102 includes a top plate portion 102a and a peripheral side wall portion (four side wall portions) 102b. The top plate portion 102a is formed in a rectangular shape. The peripheral side wall portion 102b is suspended from four sides of the top plate portion 2a, that is, front, rear, left, and right sides. The upper case 102 is formed in a bottomless rectangular box cap shape that opens downward.

The upper case 102 is disposed on the bottom plate portion 101a so as to cover the bottom plate portion 101a from above. The upper case 102 is fixed to the bottom plate portion 101a by two screws (not illustrated) in a state of being fitted between the left and right-side plate portions 101b and 101c. The upper case 102 functions as a case main body of the case, and the lower case 101 functions as a bottom lid of the case.

The upper case 102 includes a dome portion 102c and an insertion hole 102d. The dome portion 102c is formed such that a central portion of the top plate portion 102a bulges upward in a dome shape. The inner surface of the dome portion 102c is formed as a ball-like curved surface. The insertion hole 102d is formed at the top portion (central portion) of the dome portion 102c. The insertion hole 102d is formed in a circular shape. The insertion hole 102d opens the inside of the upper case 102 upward.

The main substrate 114 is a flexible substrate (FPC). The main substrate 114 is fixed on the bottom plate portion 101a in a state where the peripheral edge portion of the main substrate 114 is sandwiched between the bottom plate portion 101a and the peripheral side wall portion 102b. The main substrate 114 has a belt-shaped tail portion 114a for an external connection portion. The tail portion 114a extends in one direction (rearward) from the rectangular main body portion of the main substrate 114 and is drawn out from the inside of the upper case 102 to the outside.

The operating member 104 is a resin molded article. The operating member 104 is a round bar-shaped member. The operating member 104 includes a base portion 104a, a key top mounting portion 104b, a truncated cone portion 104c, a pair of left and right second shaft portions 104d and 104e, and a magnet accommodating hole 104f. Among the components of the operating member 104, the components 104a to 104f excluding the second shaft portions 104d and 104e are provided coaxially with one straight line extending in the Z-axis direction which is the center line of the operating member 104.

The base portion 104a is provided at a lower end portion of the operating member 104. The base portion 104a is formed in a round bar shape. The key top mounting portion 104b is provided at the upper end portion of the operating member 104. The key top mounting portion 104b is formed in a round bar shape thinner than the base portion 104a. The truncated cone portion 104c is provided between the base portion 104a and the key top mounting portion 104b and connects them in a straight line in the Z-axis direction.

The left second shaft portion 104d and the right second shaft portion 104e protrude from the lower end portion of the outer peripheral surface of the base portion 104a toward two opposite directions. The left second shaft portion 104d and the right second shaft portion 104e are provided coaxially with one straight line extending in the X-axis direction orthogonal to the center line of the operating member 4.

The magnet accommodating hole 104f is formed from the central portion of the end surface of the base portion 104a (the lower end surface of the operating member 4) to the central portion of the truncated cone portion 104c. The magnet accommodating hole 104f is a stepped hole having a circular cross section whose diameter is reduced in two stages from bottom to top. The magnet accommodating hole 104f is opened downward at the end surface of the base portion 104a (the lower end surface of the operating member 4).

The rotating member 105 is a resin molded article. The rotating member 105 is a circular ring-shaped member. The rotating member 105 includes a through hole 105a, a pair of front and rear first shaft portions 105b and 105c, a pressing portion 105d, a pressing fulcrum portion 105e, and a pair of left and right bearing portions 105f and 105g.

The through hole 105a is a hole that penetrates the rotating member 105 in the Z-axis direction. The front first shaft portion 105b and the rear first shaft portion 105c protrude from the outer peripheral surface of the rotating member 105 toward two opposite sides. The front first shaft portion 105b and the rear first shaft portion 105c are provided coaxially with one straight line extending in the Y-axis direction orthogonal to the center line of the rotating member 105.

The pressing portion 105d protrudes downward from the end portion of the front first shaft portion 105b. The lower end of the pressing portion 105d is formed in an arc shape protruding downward. The pressing fulcrum portion 105e protrudes downward from the base portion of the rear second shaft portion 105c. The lower end of the pressing fulcrum portion 105e is formed in an arc shape protruding downward.

The left bearing portion 105f and the right bearing portion 105g are circular through holes penetrating the inner and outer peripheral surfaces of the rotating member 105. The left bearing portion 105f and the right bearing portion 105g are provided coaxially with one straight line extending in the X-axis direction so as to face each other in the X-axis direction. The outer peripheral surface of the rotating member 105 is formed in a curved surface in a spherical segment shape in accordance with the inner surface of the dome portion 102c.

Figure 9:
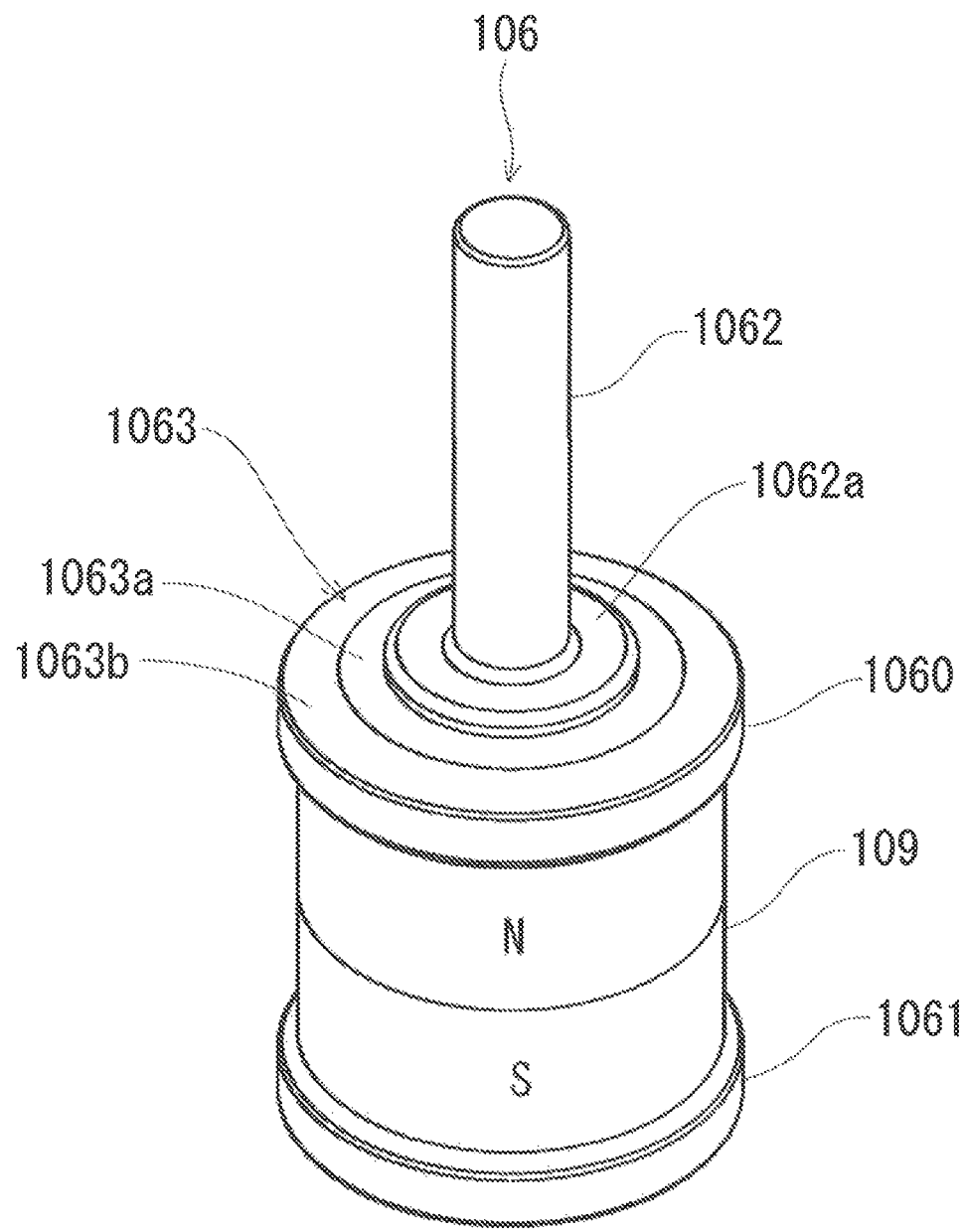
FIG. 9 is a perspective view of a magnet holding portion.

As also illustrated in FIGS. 9 and 10, the magnet 109 is a cylindrical permanent magnet magnetized (polarized) to the NS2 pole in the axial direction with the direction along the protruding direction of the operating member 104 as the axial direction. The magnet 109 is a cylindrical permanent magnet whose axial direction is the Z-axis direction. The magnet 109 has a circular through hole 109a at the central portion. The magnet 109 is magnetized to the NS2 pole in the axial direction so that both end surfaces (the upper end surface and the lower end surface) have different poles. The magnet 109 has an upper end surface as an N pole and a lower end surface as an S pole.

Figure 11A:
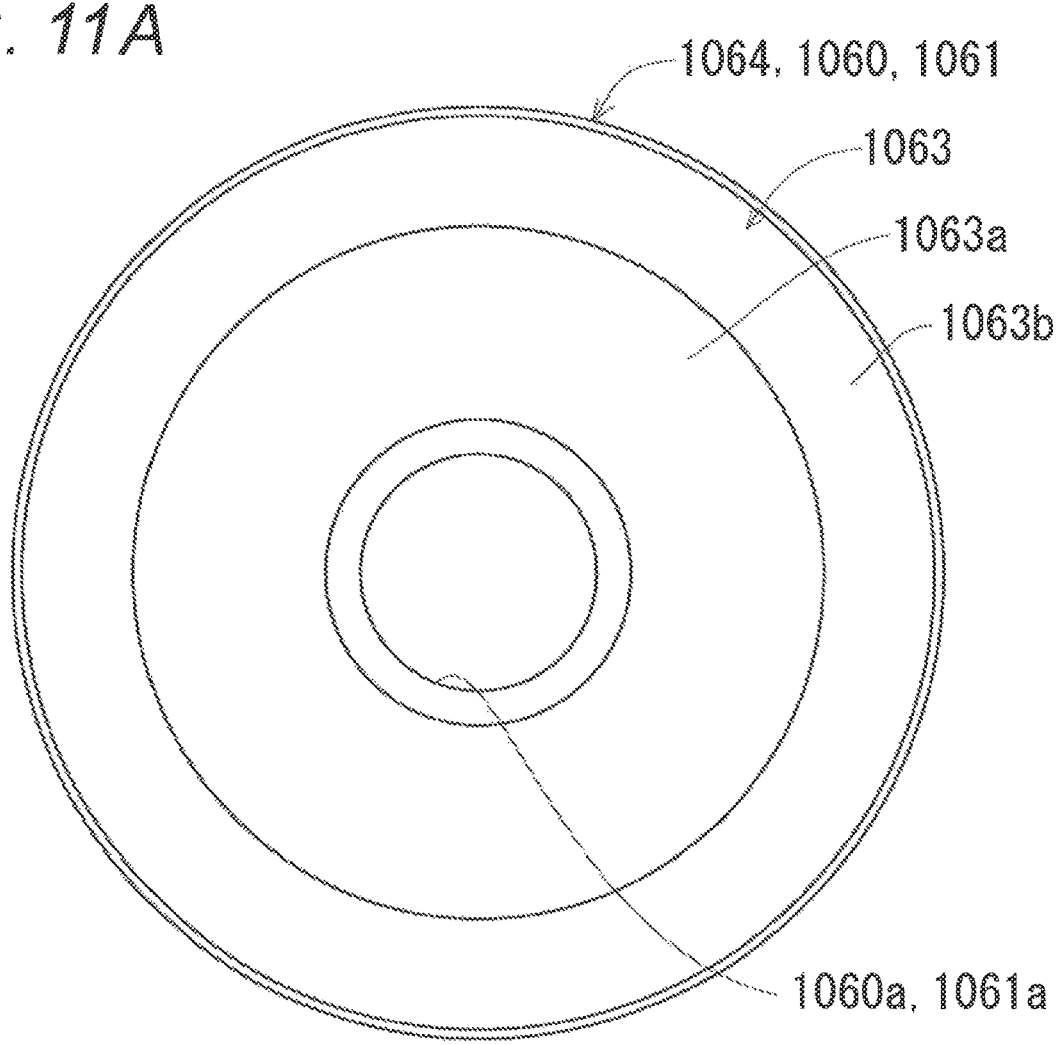
Figure 11B:
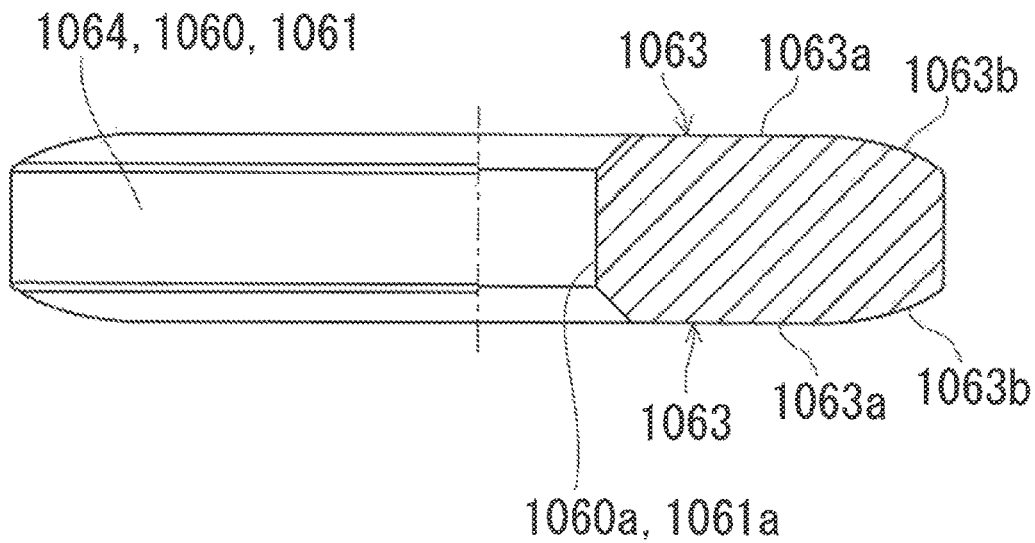

As also illustrated in FIGS. 9 to 11, the magnet holding portion 106 includes a pair of upper and lower disk portions 1060 and 1061 disposed at both ends of the magnet 109, and a pin 1062. In the same manner as the magnet 109, the upper disk portion 1060 and the lower disk portion 1061 have circular through holes 1060a and 1061a, respectively, at the central portion.

The pin 1062 is a round pin having a circular cross section fitted into the through holes 1060a, 1061a, and 109a. The pin 1062 is a pin made of metal not attached to the magnet 109 or a pin made of metal attached to the magnet 109, and is a pin subjected to surface processing such as plating so as not to be attached to the magnet 109.

The magnet holding portion 106 is configured to hold the magnet 109 between the upper disk portion 1060 and the lower disk portion 1061 in a state where the pin 1062 is inserted into the through holes 1060a, 1061a, and 109a of the upper disk portion 1060, the lower disk portion 1061, and the magnet 109. The upper disk portion 1060, the lower disk portion 1061, and the magnet 109 are provided coaxially with one straight line extending in the Z-axis direction which is the center line of the pin 1062.

The magnet holding portion 106 has an abutment surface 1063 in a spherical segment shape against the bottom plate portion 101a on the lower surface (the lower end surface of the magnet holding portion 106) of the lower disk portion 1061 facing the bottom plate portion 101a. The abutment surface 1063 includes a circular flat surface 1063a formed of a small diameter side end surface of a spherical segment and a ball-like curved surface 1063b formed of a side surface of the spherical segment.

The pin 1062 has a disk-shaped flange portion 1062a at an axially intermediate portion of the pin 1062. In the pin 1062, in a state where the flange portion 1062a is in abutment against the upper surface of the upper disk portion 1060, the lower pin 1062 is inserted from the flange portion 1062a into the through holes 1060a, 1061a, and 109a of the upper disk portion 1060, the lower disk portion 1061, and the magnet 109, the lower end of the pin 1062 is positioned inside the through hole 1061a of the lower disk portion 1061, the pin 1062 does not protrude from the lower surface of the lower disk portion 1061, and the upper pin 1062 protrudes upward from the upper surface of the upper disk portion 1060 from the flange portion 1062a.

The magnet holding portion 106 includes two disk-shaped components 1064 formed of a magnetic material attached to the magnet 109, and is configured such that the two disk-shaped components 1064 are an upper disk portion 1060 (one disk-shaped component 1064) and a lower disk portion 1061 (the other disk-shaped component 1064), abutment surfaces 1063 are provided on both surfaces of the upper disk portion 1060 and the lower disk portion 1061, and the abutment surface 1063 in a spherical segment shape provided on the lower surface of the lower disk portion 1061 (the lower surface of the magnet holding portion 106) is an abutment surface 1063 with respect to the bottom plate portion 101a.

The upper disk portion 1060 and the lower disk portion 1061 can be fixed to the pin 1062 by using an adhesive or by press-fitting the pin 1062 into the through holes 1060a and 1061a. Such fixing can suppress rattling of the magnet 109.

Cushion materials (not illustrated) may be provided between the upper disk portion 1060 and the magnet 109 and between the lower disk portion 1061 and the magnet 109 to prevent rattling of the magnet 109.

The compression coil spring 107 is made of a metal wire material not attached to the magnet 109.

In the rotating member 105, the front first shaft portion 105b and the rear first shaft portion 105c are inserted into a front guide groove 102e and a rear guide groove 102f formed inside the upper case 102. As a result, this prevents or reduces the rotation of the rotating member 105 about the center line with respect to the upper case 102. In this state, the rotating member 105 is accommodated in the upper case 102 so as to be rotatable about the axes of the front first shaft portion 105b and the rear first shaft portion 105c. The front guide groove 102e and the rear guide groove 102f are formed in an inverted U shape so as to open downward.

In the operating member 104, the base portion 104a is inserted into the through hole 105a of the rotating member 105, and the left second shaft portion 104d and the right second shaft portion 104e are inserted into the left bearing portion 105f and the right bearing portion 105g of the rotating member 105. As a result, the operating member 104 is supported by the rotating member 105 so as to be rotatable about the axes of the left second shaft portion 104d and the right second shaft portion 104e. In this state, the operating member 104 causes the key top mounting portion 104b to protrude from the inside of the upper case 102 to the upper side of the upper case 102 through the insertion hole 102d.

In a state where the compression coil spring 107 is externally fitted from the flange portion 1062a to the upper pin 1062, the magnet holding portion 106 is movably inserted into the magnet accommodating hole 104f of the operating member 104 along the center line of the operating member 104, and the lower surface of the lower disk portion 1061 faces the bottom plate portion 101a.

The compression coil spring 107 is accommodated between the flange portion 1062a and the upper surface of the magnet accommodating hole 104f and biases the operating member 104 and the rotating member 105 upward and biases the magnet holding portion 106 downward.

In a state where the operating force is not applied to the operating member 104, the magnet holding portion 106 is supported in an upright state on the bottom plate portion 101a in a state where the flat surface 1063a in the abutment surface 1063 of the lower surface of the lower disk portion 1061 is pressed against the bottom plate portion 101a by the biasing force of the compression coil spring 107, and the operating member 104 and the rotating member 105 are pushed up until the front first shaft portion 105b and the rear first shaft portion 105c are engaged with the upper ends (closed end portions) of the front guide groove 102e and the rear guide groove 102f.

As a result, the operating member 104 is supported in an upright state on the bottom plate portion 101a through the magnet holding portion 106. With this state as an initial state, the operating member 104 can be tilted and pressed in any direction of the periphery (all directions of 360 degrees). The illustrated operating member 104 can be tilted up to 16.5 degrees.

The rotating member 105 is rotatable in conjunction with the tilting operation of the operating member 104. In addition, the rotating member 105 can move downward (tilt) so as to press the pressing portion 105d with the pressing fulcrum portion 105e as a fulcrum in a state where the pressing fulcrum portion 105e is pressed against the bottom plate portion 101a along with pressing of the operating member 104.

The magnet holding portion 106 relatively moves with respect to the operating member 104 in the direction along the center line of the operating member 104 against the biasing force of the compression coil spring 107 along with pressing of the operating member 104, that is, enters the magnet accommodating hole 104f of the operating member 104, so that the magnet holding portion 106 does not move downward along with pressing of the operating member 104. That is, the magnet holding portion 106 is interlocked only with the tilting operation of the operating member 104.

In a state where the operating member 104 is tilted, the magnet holding portion 106 supports itself and the operating member 104 in a tilted state on the bottom plate portion 101a in a state where the curved surface 1063b of the abutment surface 1063 in the lower surface of the lower disk portion 1061 is pressed against the bottom plate portion 101a.

The pusher 111 and the metal dome 113 function as a pressing detector of the operating member 4. Specifically, it functions as a pressing switch, and opens and closes a fixed contact (not illustrated) formed on the main substrate 114.

The cover sheet 112 is a single-sided adhesive sheet. The metal dome 113 is a movable contact formed of an upward convex dome-shaped metal plate. An upper surface of the metal dome 13 is attached to a lower surface of the cover sheet 12 to form a metal dome sheet.

A central fixed contact (not illustrated) and an outer fixed contact (not illustrated) are formed on the main substrate 114. The central fixed contact is formed in a circular shape and is disposed below the pressing portion 105d of the rotating member 105. The outer fixed contact is formed in a C shape and is disposed so as to surround the central fixed contact at an interval.

The metal dome sheet is attached to the main substrate 114 so as to fix the metal dome 113 on the outer fixed contact in a state of straddling the central fixed contact. In this state, the top portion of the metal dome 113 is in a state of facing away from the central fixed contact immediately below the top portion with a gap.

The pusher 111 is a resin molded article. The pusher 111 is a rectangular parallelepiped member. The pusher 111 is accommodated in the upper case 102 in a state of being vertically movable. The pusher 111 is disposed between the pressing portion 105d of the rotating member 105 and the metal dome 113. The pusher 111 is biased upward by the metal dome 113, and the upper surface of the pusher 111 is pressed against the lower end of the pressing portion 105d of the rotating member 105.

When the operating member 104 is pressed, the rotating member 105 moves downward along with pressing of the operating member 104, the pusher 111 moves downward against the biasing force of the metal dome 113 by the downward movement of the rotating member 105, and the top portion of the metal dome 113 is pressed by the pusher 111. As a result, the top portion of the metal dome 113 is elastically deformed in a downward convex shape and comes into contact with the central fixed contact of the main substrate 114, the central fixed contact and the outer fixed contact of the main substrate 114 are electrically conductively connected to each other by the metal dome 113, and the pressing switch is turned on. As a result, pressing of the operating member 104 can be detected.

The magnet 109, the first magnetic sensor 110A, the second magnetic sensor 110B, and the magnet tilt angle calculation unit 116 function as a tilt operation detector of the operating member 104.

Figure 12:
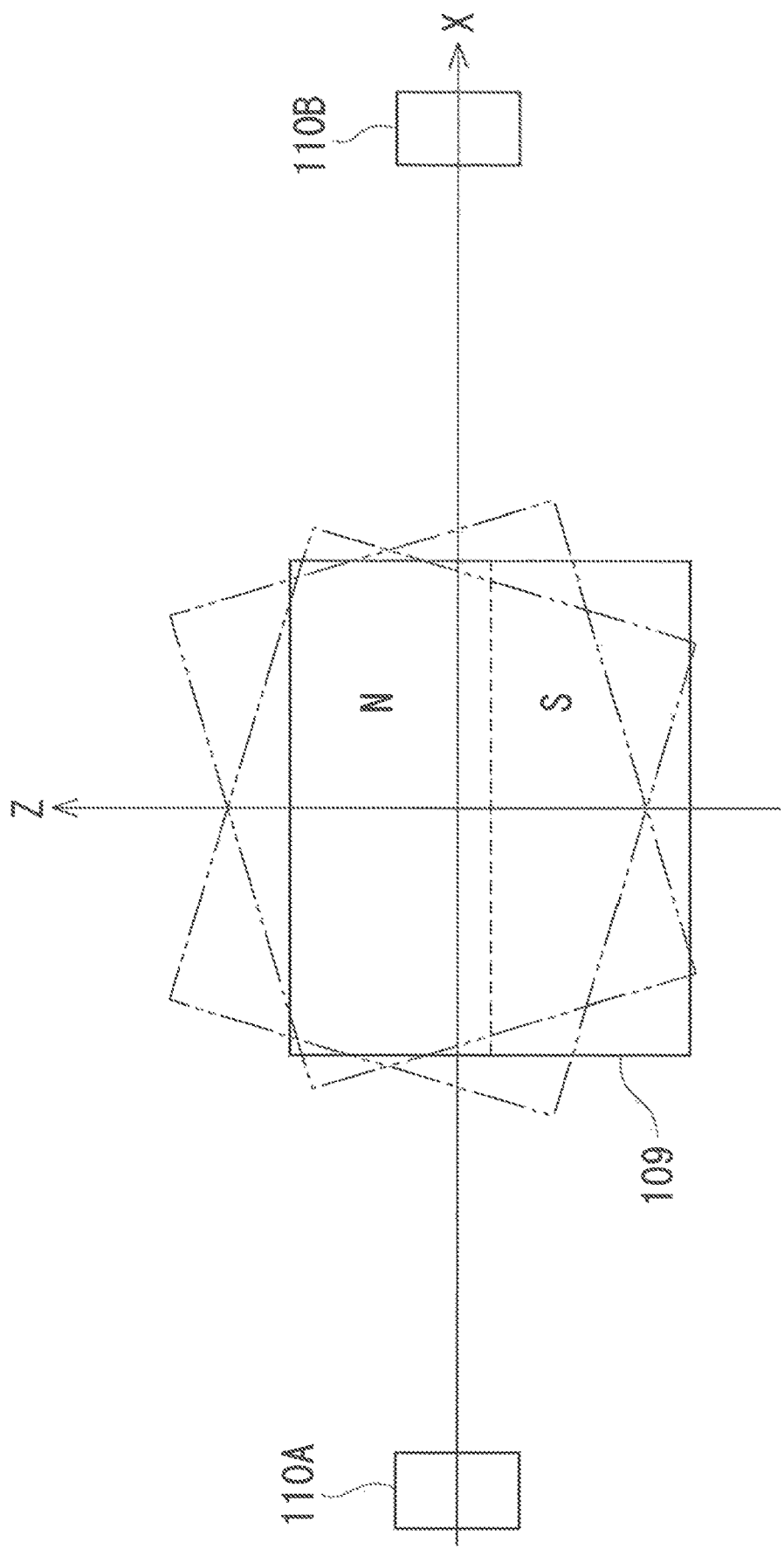
FIG. 12 is a front view illustrating a positional relationship among a magnet, a first magnetic sensor, and a second magnetic sensor.
Figure 13:
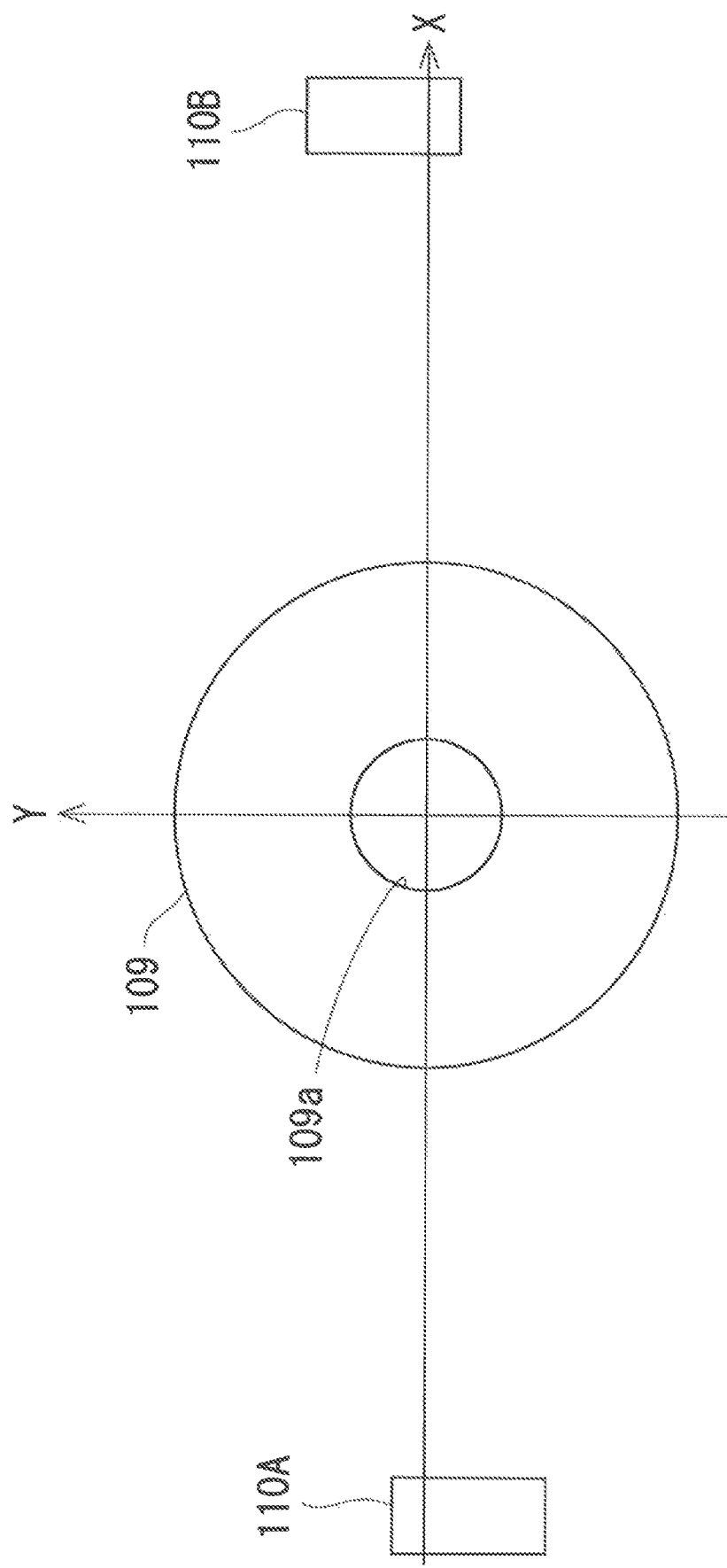
FIG. 13 is a plan view of FIG. 12.
Figure 14:
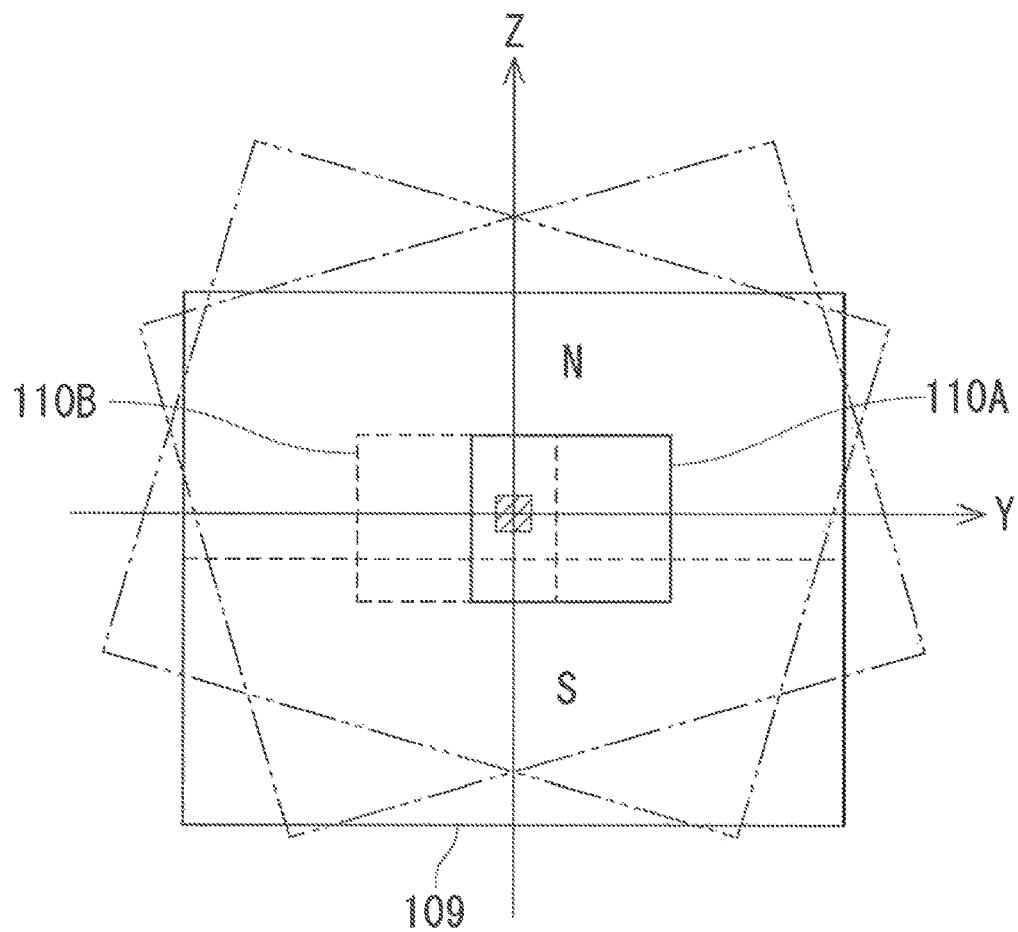
FIG. 14 is a left side view of FIG. 12.

As also illustrated in FIGS. 12 to 14, the first magnetic sensor 110A and the second magnetic sensor 110B are disposed on the sides of the magnet 109. Specifically, the first magnetic sensor 110A and the second magnetic sensor 110B are disposed at two positions on the sides of the magnet 109 that are point-symmetric with respect to the axis (center line) of the magnet 109. More specifically, the first magnetic sensor 110A and the second magnetic sensor 110B are arranged in a direction (X-axis direction) orthogonal to the protruding direction (Y-axis direction) of the front first shaft portion 105b and the rear first shaft portion 105c.

The first magnetic sensor 110A is disposed on the left side of the rotating member 105 and faces the magnet 109 with a predetermined distance. The second magnetic sensor 110B is disposed on the right side of the rotating member 105 and faces the magnet 109 at the same distance as the first magnetic sensor 110A.

The first magnetic sensor 110A and the second magnetic sensor 110B are surface mounted on a first sub-substrate 115A and a second sub-substrate 115B made of small rigid substrates. Each of the first sub-substrate 115A and the second sub-substrate 115B is vertically erected on the main substrate 114 in a state where the sensor mounting surface is held inside the upper case 102 so as to be orthogonal to one straight line extending in the X-axis direction orthogonal to the axis (center line) of the magnet 109.

The first magnetic sensor 110A and the second magnetic sensor 110B are the same magnetic sensors and are magnetic sensors capable of detecting magnetic flux densities in three axial directions orthogonal to one another of the X axis, the Y axis, which are radial planes of the magnet 109, and the Z axis, which is an axial direction of the magnet 109. As this magnetic sensor, for example, a 3D Hall sensor or the like can be used.

The first magnetic sensor 110A and the second magnetic sensor 110B are disposed such that centers of respective magnetic-sensitive portions 110Ax and 110Bx in the X-axis direction are coaxial with one straight line extending in the X-axis direction orthogonal to the axis (center line) of the magnet 109.

Figure 15:
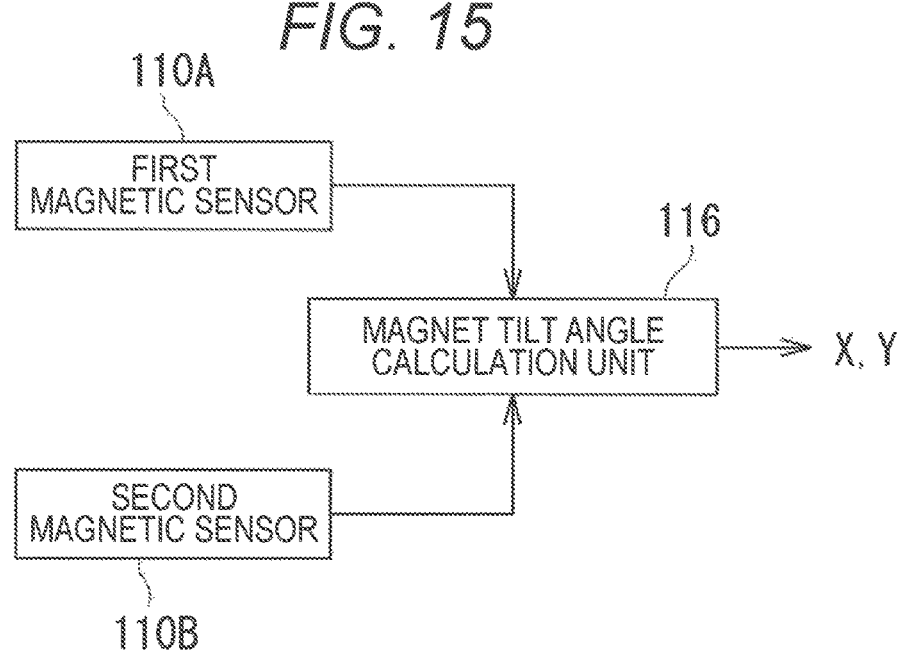
FIG. 15 is a processing block diagram of output signals of the first magnetic sensor and the second magnetic sensor.

As illustrated in FIG. 15, the first magnetic sensor 110A and the second magnetic sensor 110B are connected to the magnet tilt angle calculation unit 116, and a tilt angle of the magnet 109, that is, a tilt operation of the operating member 104 is detected. Specifically, (1) the magnetic flux densities Bx, By, and Bz in the three axial directions are measured and output by the first magnetic sensor 110A and the second magnetic sensor 110B. (2) The magnet tilt angle calculation unit 116 calculates an angle formed by magnetic flux density vectors Bz and By and an angle formed by magnetic flux density vectors Bz and Bx in the first magnetic sensor 110A and the second magnetic sensor 110B based on output values of the first magnetic sensor 110A and the second magnetic sensor 110B. (3) The magnet tilt angle calculation unit 116 calculates the tilt angle of the magnet 109 based on the result of (2). That is, an output value A of the first magnetic sensor 110A and an output value B of the second magnetic sensor 110B are added, divided by 2, and averaged.

Figure 16:
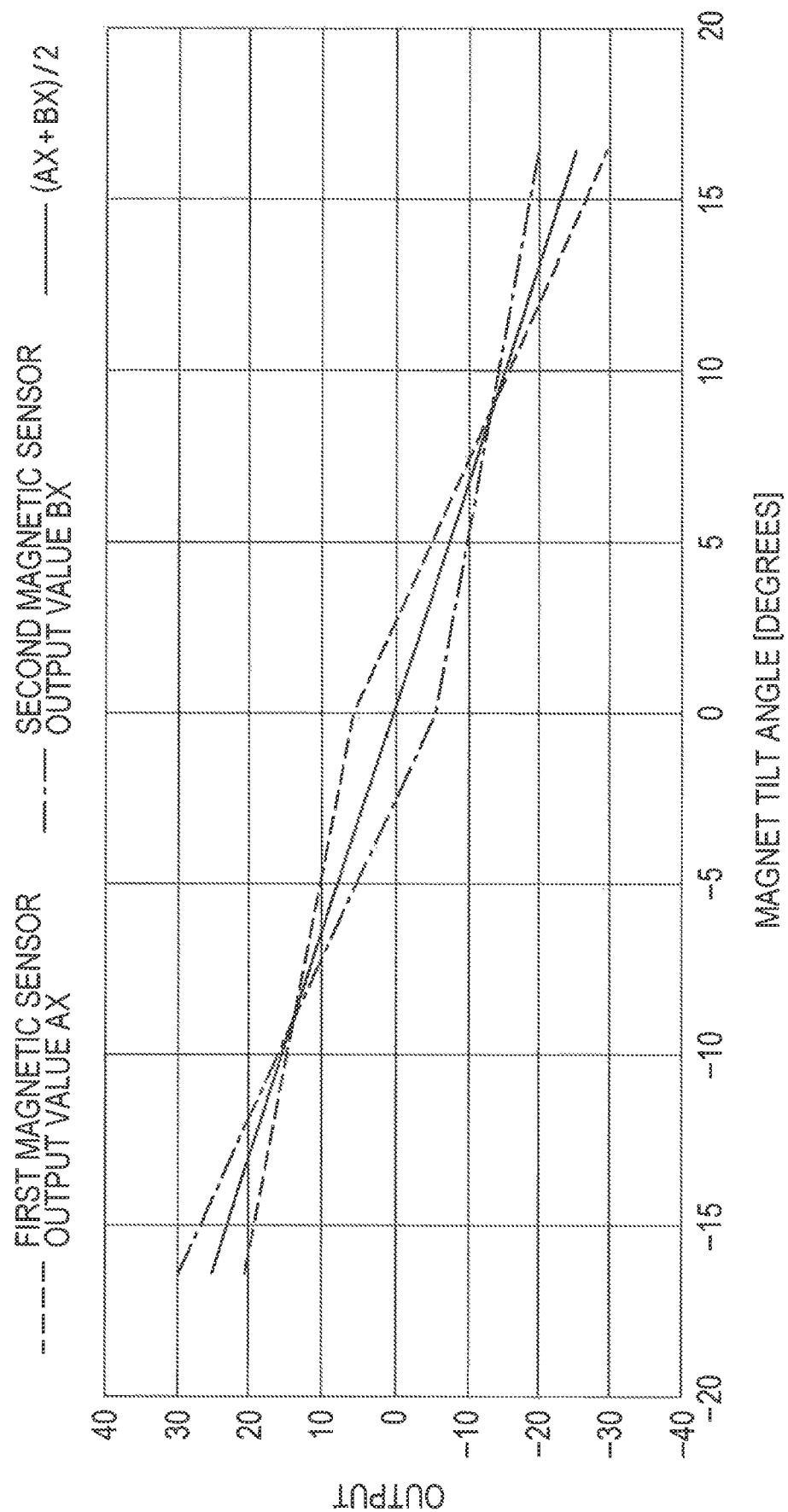
FIG. 16 is a diagram showing an analysis result of detection of a tilt amount of the operating member in an X-axis direction.
Figure 17:
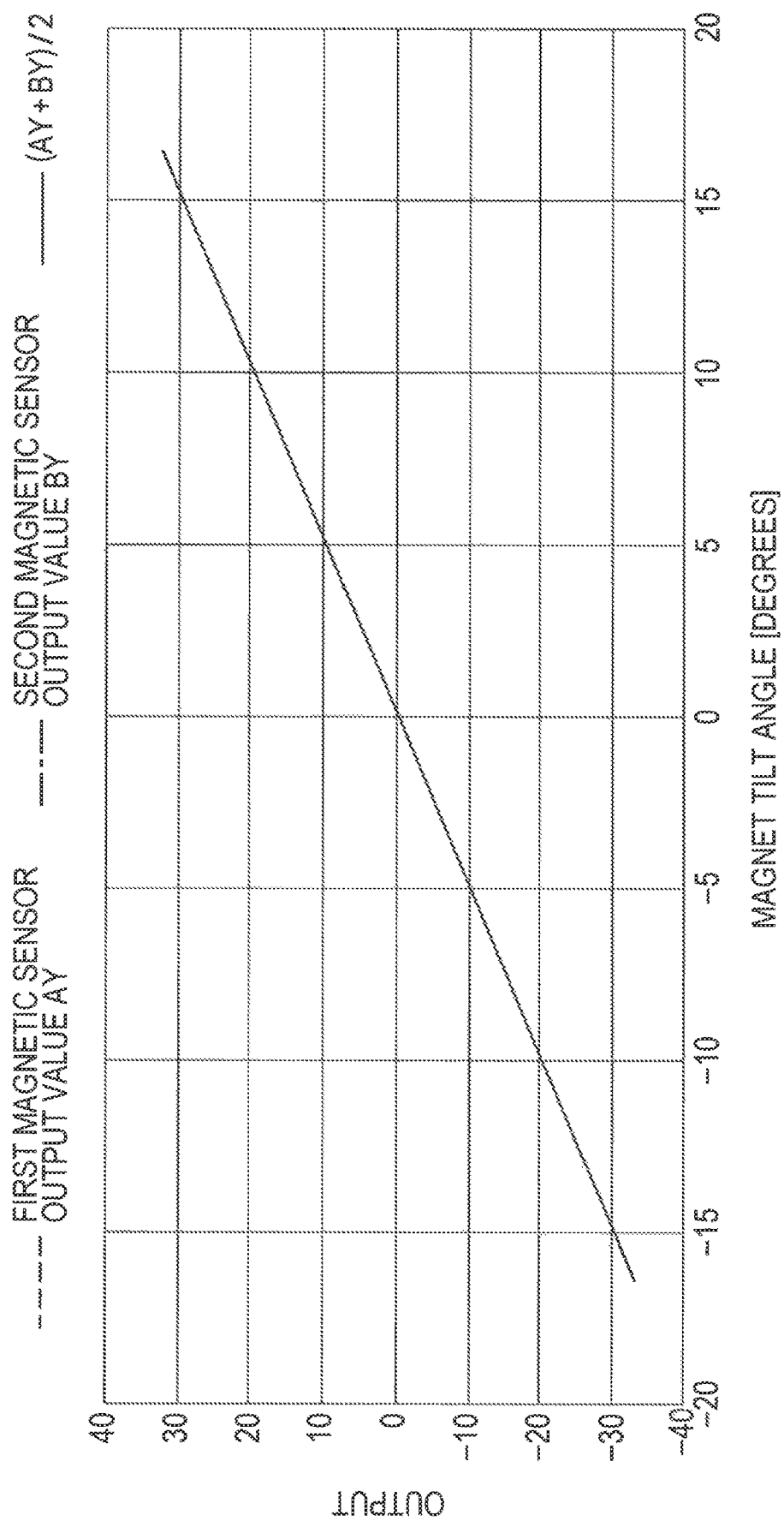
FIG. 17 is a diagram showing an analysis result of detection of a tilt amount of the operating member in a Y-axis direction.

Here, in the detection of the tilt amounts in the Y-axis direction in which the distances of the first magnetic sensor 110A and the second magnetic sensor 110B with respect to the magnet 109 do not change, as shown in FIG. 17, substantially the same outputs are output in both the first magnetic sensor 110A and the second magnetic sensor 110B, and the average values also overlap each other. On the other hand, in the detection of the tilt amounts in the X-axis direction in which the distances of the first magnetic sensor 110A and the second magnetic sensor 110B with respect to the magnet 109 changes, as shown in FIG. 16, the tilt of the output value with respect to the tilt angle of the magnet 109 differs between the case where the magnet 109 approaches and the case where the magnet 109 moves away from the first magnetic sensor 110A and the second magnetic sensor 110B, but the output obtained by adding the output value A of the first magnetic sensor 110A and the output value B of the second magnetic sensor 110B and averaging the sum by 2 has a substantially linear output characteristic with respect to the tilt angle. That is, it can be seen that the influence of the difference in the tilting direction is offset.

In the multi-directional input device, the magnet tilt angle calculation unit 116 is provided outside the multi-directional input device, that is, in various electronic devices such as a game machine controller including the multi-directional input device, but may be provided inside the multi-directional input device.

Figure 18:
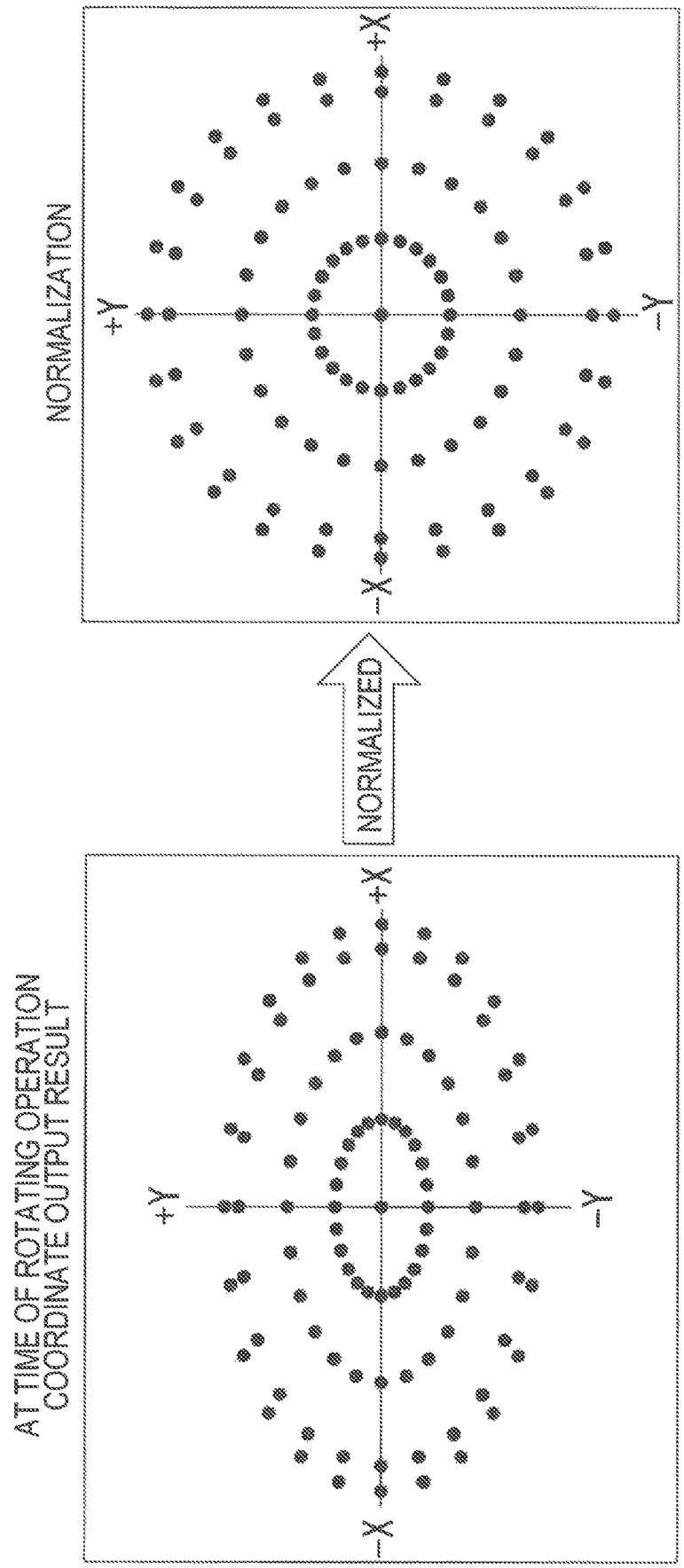
FIG. 18 is a diagram showing an analysis result of X-Y coordinate output values at the time of omnidirectional tilt.
Figure 19:
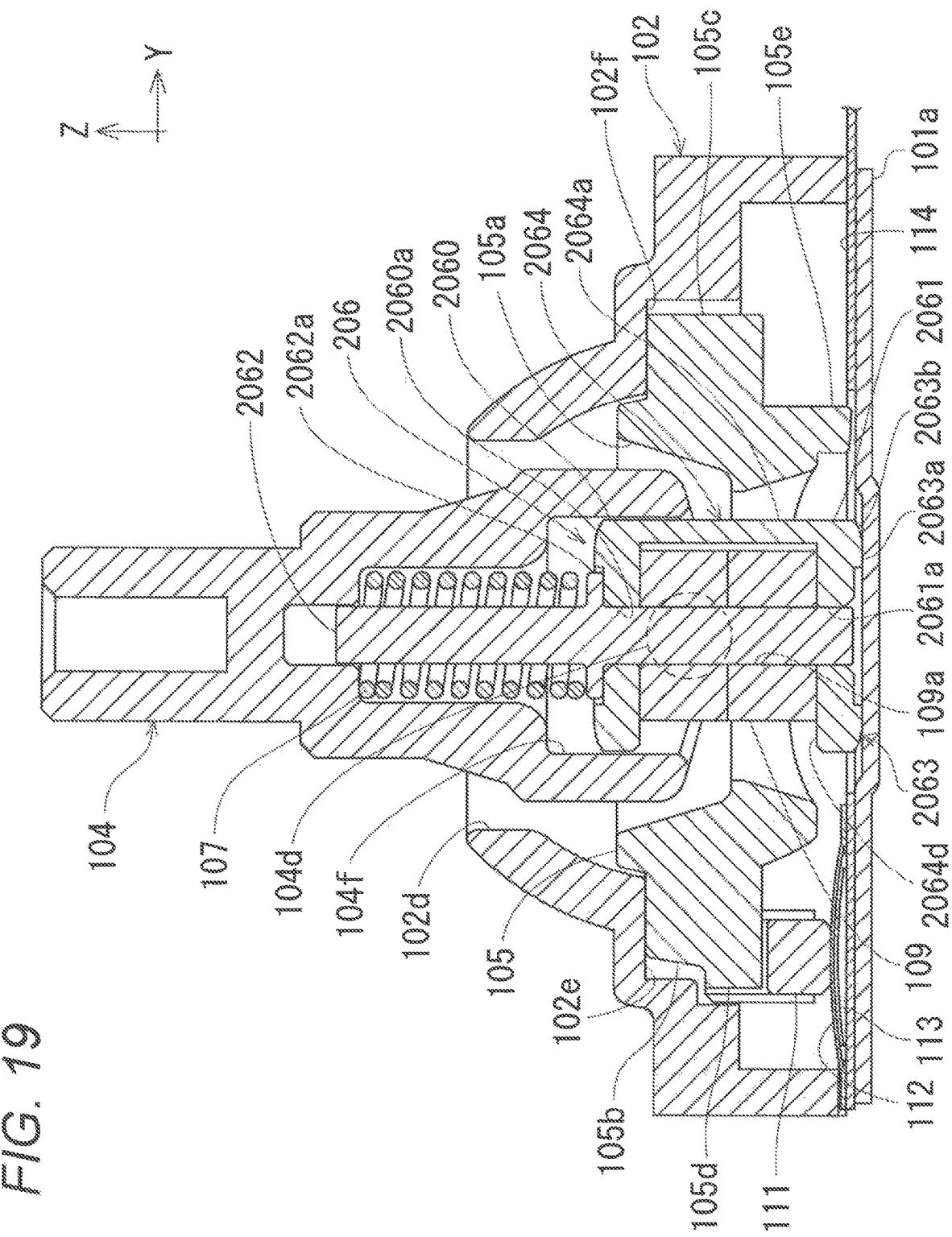
FIG. 19 is a cross-sectional view corresponding to FIG. 5, illustrating a first modification of the magnet holding portion.
Figure 20:
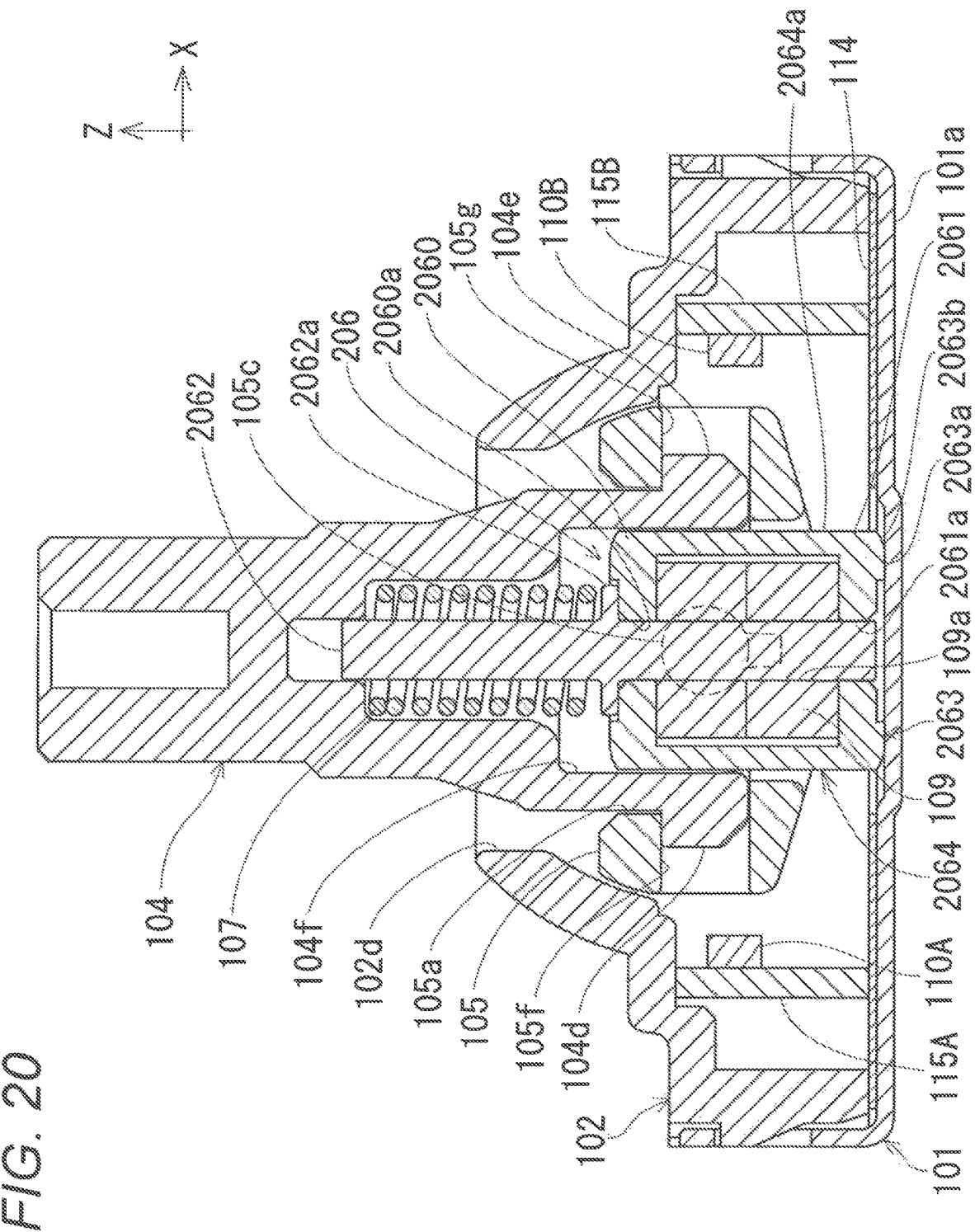
FIG. 20 is a cross-sectional view corresponding to FIG. 7, illustrating the first modification of the magnet holding portion.
Figure 21:
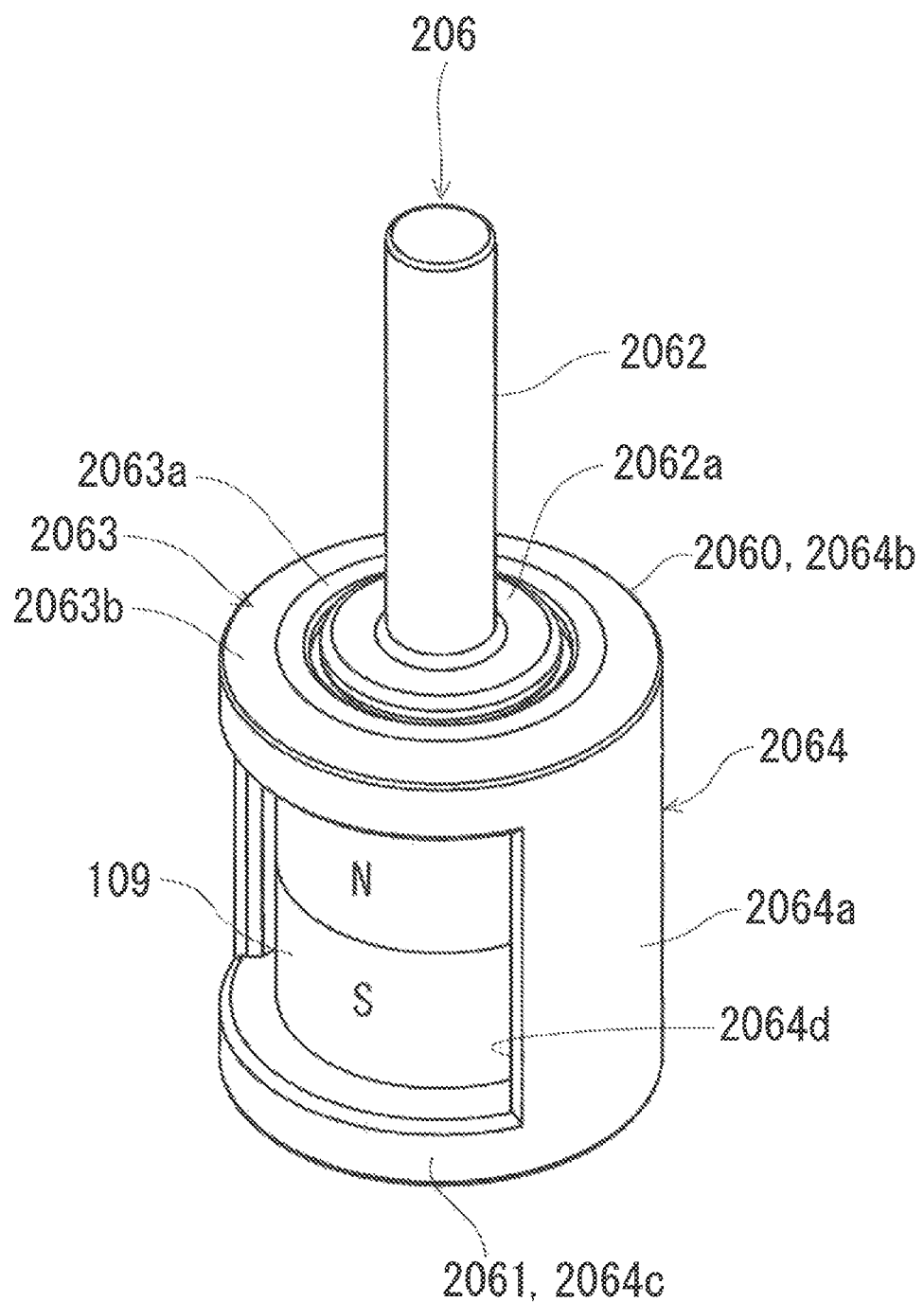
FIG. 21 is a perspective view illustrating the first modification of the magnet holding portion.
Figure 22:
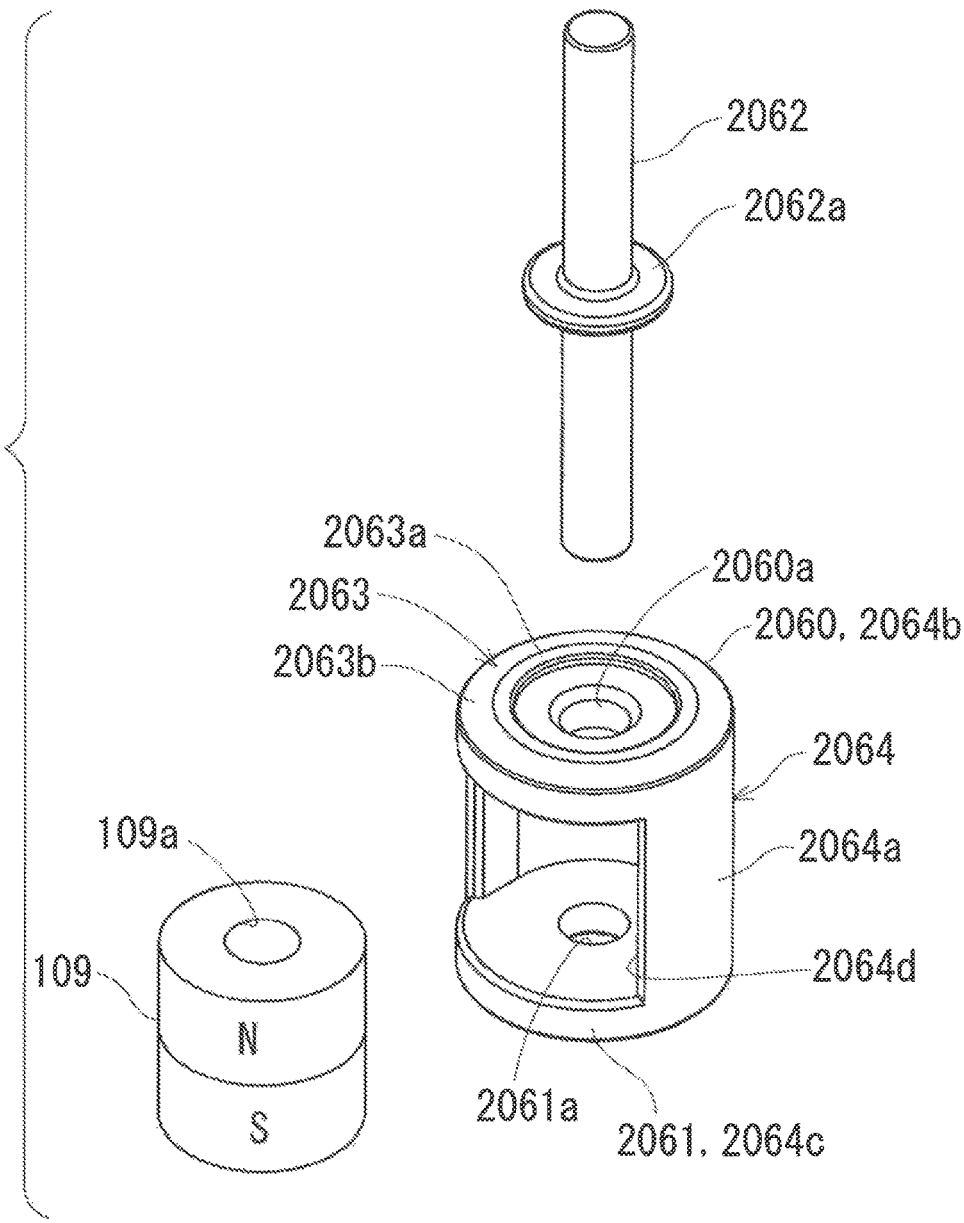
FIG. 22 is an exploded perspective view illustrating the first modification of the magnet holding portion.
Figure 23A:
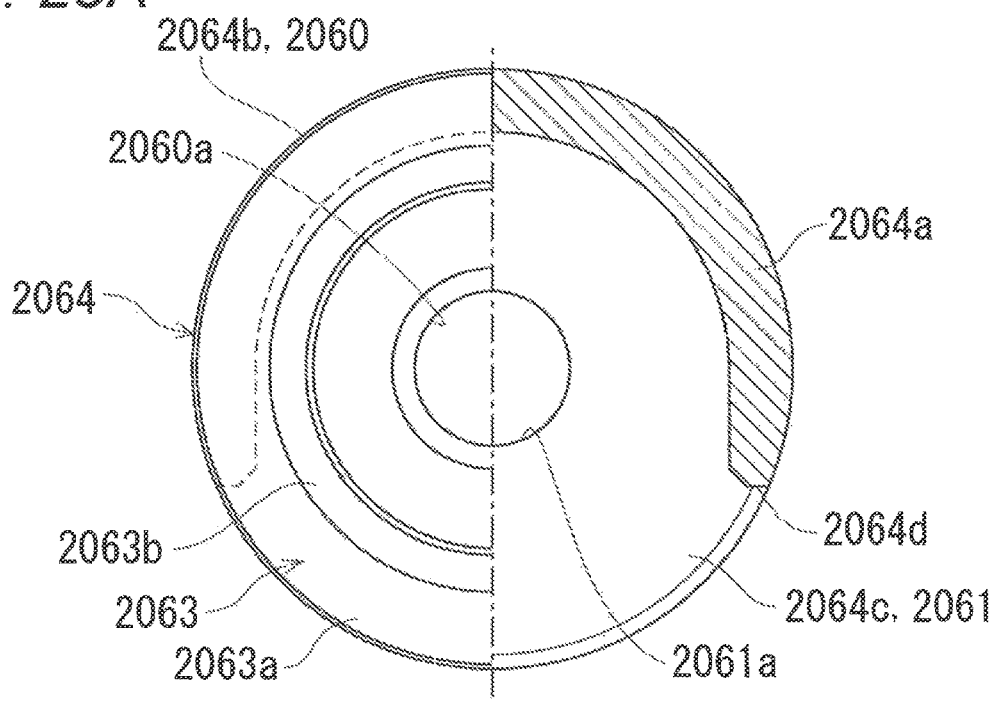
Figure 23B:
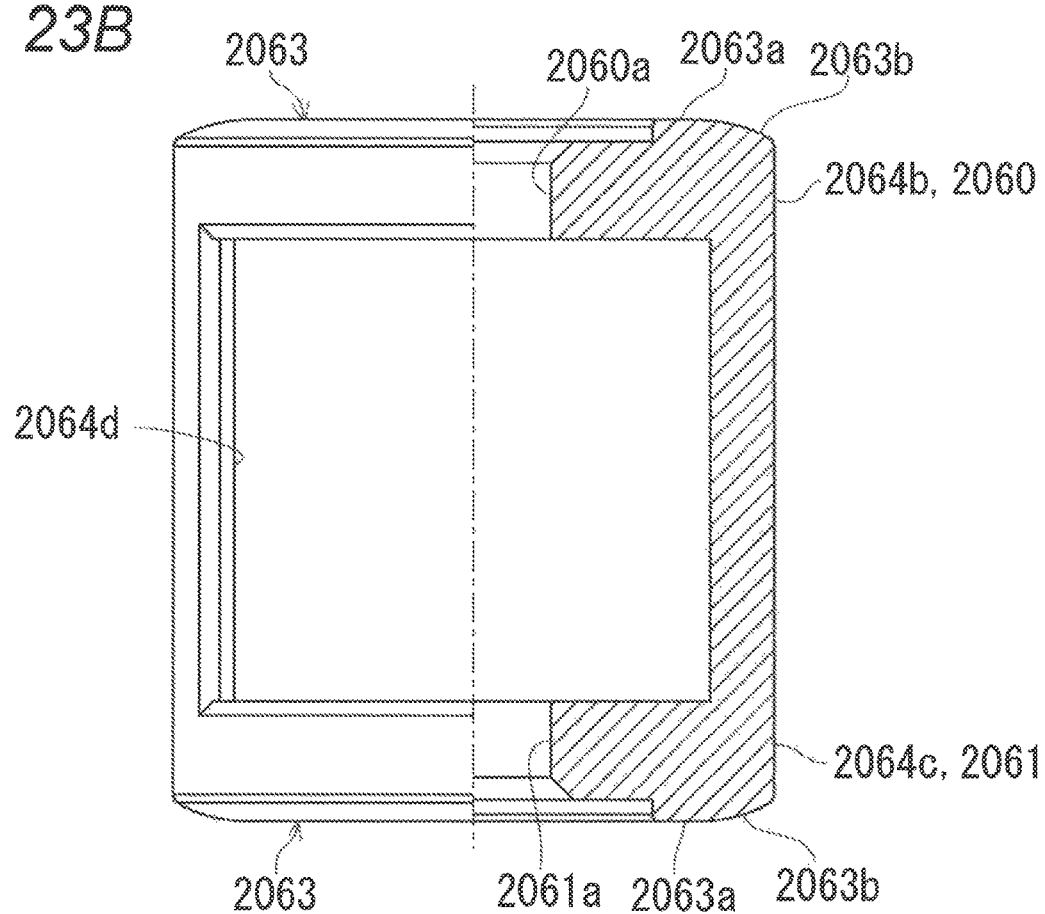

FIG. 18 shows an analysis result of output values (X-Y coordinate output values) when the operation is performed at azimuth angles in increments of 15 degrees (0 degrees to 360 degrees) and tilt angles of 0, 5, 10, 15, and 16.5 degrees. Referring to FIG. 18, an elliptical output on the left side is obtained, and when the elliptical output is normalized, the elliptical output becomes a circular output on the right side, and a deviation of the output value due to the tilting direction and a lack of linearity are not observed.

A first modification of the magnet holding portion will be described with reference to FIGS. 19 to 23A and 23B. A magnet holding portion 206 of the first modification is replaced with the magnet holding portion 106 described above.

The magnet holding portion 206 includes a pair of upper and lower disk portions 2060 and 2061 disposed at both ends of the magnet 109, and a pin 2062. In the same manner as the magnet 109, the upper disk portion 2060 and the lower disk portion 2061 have circular through holes 2060a and 2061a, respectively, at the central portion.

The pin 2062 is a round pin having a circular cross section fitted into the through holes 2060a, 2061a, and 109a. The pin 2062 is a pin made of metal not attached to the magnet 109 or a pin made of metal attached to the magnet 109, and is a pin subjected to surface processing such as plating so as not to be attached to the magnet 109.

The magnet holding portion 206 is configured to hold the magnet 109 between the upper disk portion 2060 and the lower disk portion 2061 in a state where the pin 2062 is inserted into the through holes 2060a, 2061a, and 109a of the upper disk portion 2060, the lower disk portion 2061, and the magnet 109. The upper disk portion 2060, the lower disk portion 2061, and the magnet 109 are provided coaxially with one straight line extending in the Z-axis direction which is the center line of the pin 2062.

The magnet holding portion 206 has an abutment surface 2063 in a spherical segment shape against the bottom plate portion 101a on the lower surface (the lower end surface of the magnet holding portion 206) of the lower disk portion 2061 facing the bottom plate portion 101a. The abutment surface 2063 includes a circular flat surface 2063a formed of a small diameter side end surface of the spherical segment and a ball-like curved surface 2063b formed of a side surface of the spherical segment.

The pin 2062 has a disk-shaped flange portion 2062a at an axially intermediate portion of the pin 2062. In the pin 2062, in a state where the flange portion 2062a is in abutment against the upper surface of the upper disk portion 2060, the lower pin 2062 is inserted from the flange portion 2062a into the through holes 2060a, 2061a, and 109a of the upper disk portion 2060, the lower disk portion 2061, and the magnet 109, the lower end of the pin 2062 is positioned inside the through hole 2061a of the lower disk portion 2061, the pin 2062 does not protrude from the lower surface of the lower disk portion 2061, and the upper pin 2062 protrudes upward from the upper surface of the upper disk portion 2060 from the flange portion 2062a.

The magnet holding portion 206 includes a cylindrical component 2064 in which a side wall portion 2064a having a C-shaped cross section and a pair of disk-shaped end wall portions 2064b and 2064c for closing both end openings of the side wall portion 2064a are integrally formed of a nonmagnetic material (synthetic resin), and which has a side window 2064d into which the magnet 109 can be inserted from the side. The magnet holding portion 206 is configured such that the pair of disk-shaped end wall portions 2064b and 2064c are an upper disk portion 2060 and a lower disk portion 2061, abutment surfaces 2063 are provided on an upper surface (outer surface) of the upper disk portion 2060 and a lower surface (outer surface) of the lower disk portion 2061, and the abutment surface 2063 having a spherical segment shape and provided on the lower surface (lower surface of the magnet holding portion 206) of the lower disk portion 2061 is the abutment surface 2063 against the bottom plate portion 101a.

The upper disk portion 2060 and the lower disk portion 2061 can be fixed to the pin 2062 by using an adhesive or by press-fitting the pin 2062 into the through holes 2060a and 2061a. Such fixing can suppress rattling of the magnet 109.

Cushion materials (not illustrated) may be provided between the upper disk portion 2060 and the magnet 109 and between the lower disk portion 2061 and the magnet 109 to prevent rattling of the magnet 109.

In a state where the compression coil spring 107 is externally fitted from the flange portion 2062a to the upper pin 2062, the magnet holding portion 206 is movably inserted into the magnet accommodating hole 104f of the operating member 104 along the center line of the operating member 104, and the lower surface of the lower disk portion 2061 faces the bottom plate portion 101a.

The compression coil spring 107 is accommodated between the flange portion 2062a and the upper surface of the magnet accommodating hole 104f and biases the operating member 104 and the rotating member 105 upward and biases the magnet holding portion 206 downward.

In a state where the operating force is not applied to the operating member 104, the magnet holding portion 206 is supported in an upright state on the bottom plate portion 101a in a state where the flat surface 2063a in the abutment surface 2063 of the lower surface of the lower disk portion 2061 is pressed against the bottom plate portion 101a by the biasing force of the compression coil spring 107.

The magnet holding portion 206 relatively moves with respect to the operating member 104 in the direction along the center line of the operating member 104 against the biasing force of the compression coil spring 107 along with pressing of the operating member 104, that is, enters the magnet accommodating hole 104*f* of the operating member 104, so that the magnet holding portion 206 does not move downward along with pressing of the operating member 104. That is, the magnet holding portion 206 is interlocked only with the tilting operation of the operating member 104.

In a state where the operating member 104 is tilted, the magnet holding portion 206 supports itself and the operating member 104 in a tilted state on the bottom plate portion 101*a* in a state where the curved surface 2063*b* of the abutment surface 2063 in the lower surface of the lower disk portion 2061 is pressed against the bottom plate portion 101*a*.

Figure 24:
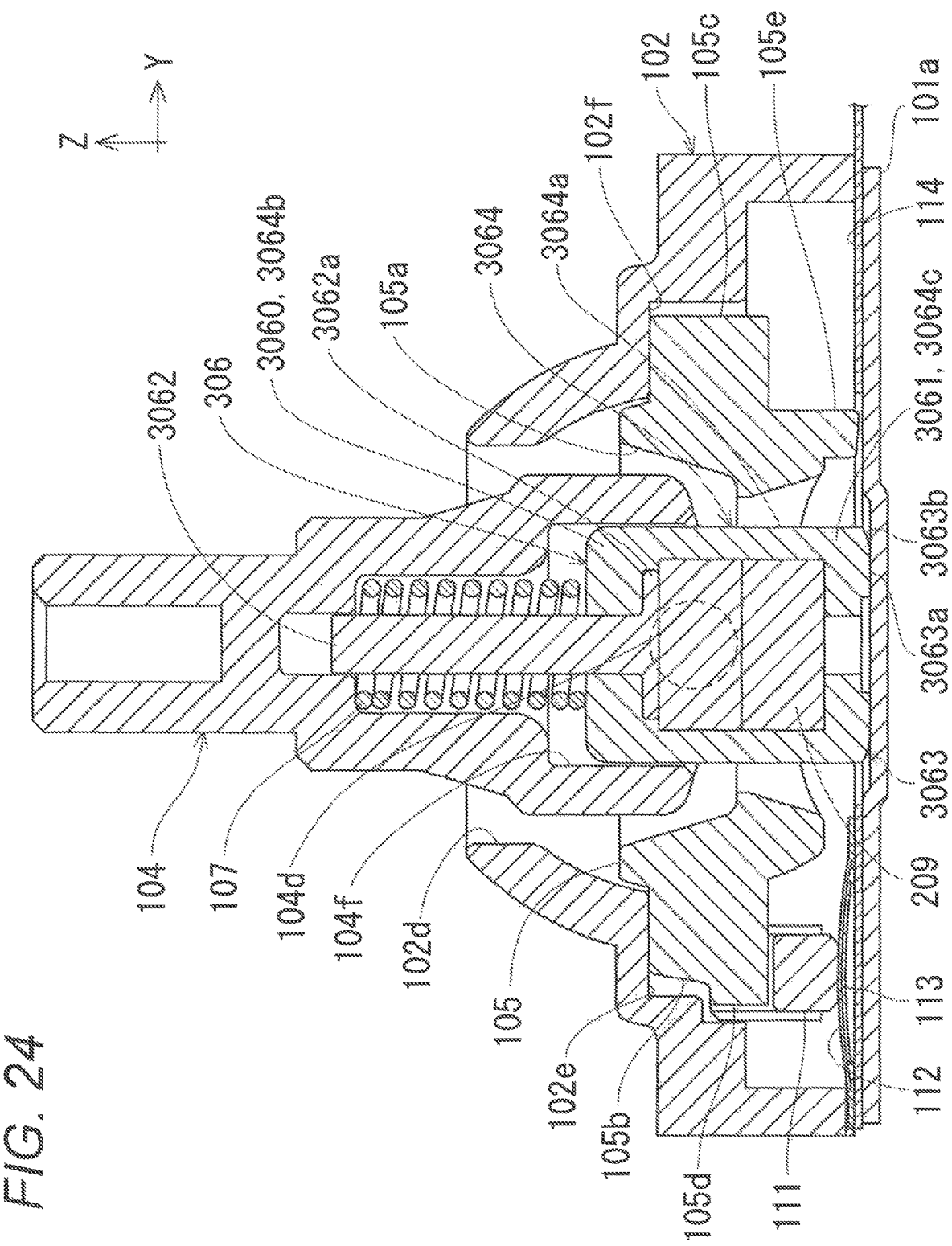
FIG. 24 is a cross-sectional view corresponding to FIG. 5, illustrating a second modification of the magnet holding portion.

A second modification of the magnet holding portion will be described with reference to FIG. 24. A magnet holding portion 306 of the second modification is replaced with the magnet holding portions 106 and 206 described above.

The magnet 209 is different from the magnet 109 in that a circular through hole is not provided at the central portion. That is, the magnet 209 is a columnar permanent magnet magnetized (polarized) to the NS2 pole in the axial direction with the direction along the protruding direction of the operating member 104 as the axial direction. The magnet 209 is a columnar permanent magnet whose axial direction is the Z-axis direction. The magnet 209 is magnetized to the NS2 pole in the axial direction so that both end surfaces (the upper end surface and the lower end surface) have different poles. The magnet 209 has an upper end surface as an N pole and a lower end surface as an S pole.

In the same manner as the magnet holding portions 106 and 206, the magnet holding portion 306 includes a pair of upper and lower disk portions 3060 and 3061 disposed at both ends of the magnet 209, and a pin 3062.

The pin 3062 is a round pin having a circular cross section. The pin 3062 is a pin made of metal not attached to the magnet 209 or a pin made of metal attached to the magnet 209, and is a pin subjected to surface processing such as plating so as not to be attached to the magnet 209.

The pin 3062 is located coaxially with the magnet 209 and protrudes upward (in the protruding direction of the operating member 104) from the upper disk portion 2060 (one of the disk portions in the protruding direction of the operating member 104).

The pin 3062 is located coaxially with the magnet 209 in a state where the lower end of the pin 3062 is in abutment against the upper surface of the magnet 209 and protrudes upward (in the protruding direction of the operating member 104) from the upper disk portion 2060 (one of the disk portions in the protruding direction of the operating member 104). The pin 3062 has a disk-shaped flat head 3062*a*, and the flat head 3062*a* is in abutment against the upper surface of the magnet 209.

The magnet holding portion 306 has an abutment surface 3063 in a spherical segment shape against the bottom plate portion 101*a* on the lower surface (the lower end surface of the magnet holding portion 306) of the lower disk portion 3061 facing the bottom plate portion 101*a*. The abutment surface 3063 includes a circular flat surface 3063*a* formed of a small diameter side end surface of the spherical segment and a ball-like curved surface 3063*b* formed of a side surface of the spherical segment.

The magnet holding portion 306 includes a cylindrical component 3064 in which a cylindrical side wall portion 3064*a* disposed on an outer periphery of the magnet 209 and a pair of disk-shaped end wall portions 3064*b* and 3064*c* for closing both end openings of the side wall portion 3064*a* are integrally formed of a nonmagnetic material (synthetic resin), and which covers the entire magnet 209. The magnet holding portion 306 is configured such that the pair of disk-shaped end wall portions 3064*b* and 3064*c* are an upper disk portion 3060 and a lower disk portion 3061, an abutment surface 3063 is provided on a lower surface (outer surface) of the lower disk portion 3061, and the abutment surface 3063 having a spherical segment shape and provided on the lower surface (lower surface of the magnet holding portion 306) of the lower disk portion 3061 is the abutment surface 3063 against the bottom plate portion 101*a*.

The magnet holding portion 306 including the magnet 206, the pin 3062, and the cylindrical component 3064 is integrally formed by insert molding in a state where the lower end portions of the magnet 206 and the pin 3062 are embedded in the cylindrical component 3064.

In a state where the compression coil spring 107 is externally fitted to the pin 3062 protruding upward from the upper disk portion 3060, the magnet holding portion 306 is movably inserted into the magnet accommodating hole 104*f* of the operating member 104 along the center line of the operating member 104, and the lower surface of the lower disk portion 3061 faces the bottom plate portion 101*a*.

The compression coil spring 107 is accommodated between the upper disk portion 3060 and the upper surface of the magnet accommodating hole 104*f* and biases the operating member 104 and the rotating member 105 upward and biases the magnet holding portion 306 downward.

In a state where the operating force is not applied to the operating member 104, the magnet holding portion 306 is supported in an upright state on the bottom plate portion 101*a* in a state where the flat surface 3063*a* in the abutment surface 3063 of the lower surface of the lower disk portion 3061 is pressed against the bottom plate portion 101*a* by the biasing force of the compression coil spring 107.

The magnet holding portion 306 relatively moves with respect to the operating member 104 in the direction along the center line of the operating member 104 against the biasing force of the compression coil spring 107 along with pressing of the operating member 104, that is, enters the magnet accommodating hole 104*f* of the operating member 104, so that the magnet holding portion 306 does not move downward along with pressing of the operating member 104. That is, the magnet holding portion 306 is interlocked only with the tilting operation of the operating member 104.

In a state where the operating member 104 is tilted, the magnet holding portion 306 supports itself and the operating member 104 in a tilted state on the bottom plate portion 101*a* in a state where the curved surface 3063*b* of the abutment surface 3063 in the lower surface of the lower disk portion 3061 is pressed against the bottom plate portion 101*a*.

As described above, the multi-directional input device includes: the cases 101 and 102; the operating member 104 that protrudes from the case 102 and can be tilted; the elastic member 107 that returns the operating member 104 to the initial state before the tilting operation; the magnet holding portion 106 (or 206 or 306) that is relatively movable with respect to the operating member 104 only in the direction along the protruding direction and is interlocked only in the tilting direction; the magnet 109 (or 209) arranged in the magnet holding portion 106 (or 206 or 306); and the magnetic sensors 110A and 110B that are arranged at positions facing the magnet 109 (or 209) and detect the movement of the magnet 109 (or 209), in which the magnet holding portion 106 (or 206 or 306) includes the pair of disk portions 1060 (or 2060 or 3060) and 1061 (or 2061 or 3061) arranged at both ends of the magnet 109 (or 209), and the pin 1062 (or 2062 or 3062) that is located coaxially with the magnet 109 (or 209) and protrudes in the protruding direction of the operating member 104 from one of the disk portions 1060 (or 2060 or 3060) in the protruding direction of the operating member 104. The magnetic sensors 110 A and 110B are disposed on the sides of the magnet 109 (or 209) and detect magnetic components in three axial directions orthogonal to one another.

In the multi-directional input device, the magnetic sensors 110A and 110B are magnetic sensors that are disposed on the sides of the magnet 109 (or 209) and can detect magnetic components in three axial directions orthogonal to one another. As compared with a case where the magnetic sensors are disposed below the magnet, it is possible to reduce the height of a product, secure an appropriate distance (for example, such a distance that minute rattling of the magnet does not adversely affect the detection of the tilting operation of the operating member) between the magnet 109 (or 209) and the magnetic sensors 110A and 110B, and improve the detection accuracy of the tilting operation of the operating member 104.

In the multi-directional input device, the magnetic sensors 110A and 110B are magnetic sensors disposed at two positions on the sides of the magnet 109 (or 209) that are point-symmetric with respect to the axis of the magnet 109 (or 209) and can detect magnetic components in three axial directions orthogonal to one another while facing the magnet 109 (or 209), another multi-directional input device includes the magnet tilt angle calculation unit 116 that calculates a tilt angle of the magnet 109 (or 209) based on output values of both the magnetic sensors 110A and 110B, and the magnet tilt angle calculation unit averages an angle of a magnetic flux density vector calculated based on the output value of one magnetic sensor and an angle of a magnetic flux density vector calculated based on the output value of the other magnetic sensor.

In the multi-directional input device, the magnetic sensors 110A and 110B are magnetic sensors that are disposed on the sides of the magnet 109 (or 209) and can detect magnetic components in three axial directions orthogonal to one another. The multi-directional input device includes the magnet tilt angle calculation unit 116 that calculates a tilt angle of the magnet 109 (or 209) based on output values of both the magnetic sensors 110A and 110B. The magnet tilt angle calculation unit 116 averages an angle of a magnetic flux density vector calculated based on the output value of one magnetic sensor and an angle of a magnetic flux density vector calculated based on the output value of the other magnetic sensor, so that the detection accuracy of the tilt operation of the operating member 104 by the magnetic sensors 110A and 110B disposed on the sides of the magnet 109 (or 209) can be improved while trying to reduce the height of the product.

In the multi-directional input device, the magnet 109 (or 209) is held by the magnet holding portion 106 (or 206 or 306) that is relatively movable with respect to the operating member 104 only in the direction along the protruding direction and is interlocked only in the tilting direction. Therefore, even if the operating member 104 moves downward against the compression coil spring 107, the magnet 109 (or 209) does not move downward, and the magnetic field does not change. Therefore, the detection accuracy of the tilting operation of the operating member 104 can be improved.

In the multi-directional input device, the magnet holding portion 106 includes the pair of disk portions 1060 and 1061 disposed at both ends of the magnet 109, and the pin 1062 that is located coaxially with the magnet 109 and protrudes in the protruding direction of the operating member 104 from one of the disk portions 1060 in the protruding direction of the operating member 104. Therefore, when the outer diameter of the magnet 109 is increased, it is not necessary to increase the outer diameter of the magnet holding portion 106 accordingly, and the magnet 109 can be increased without increasing the size of the product, so that the detection accuracy of the tilting operation of the operating member 104 can be improved.

In the multi-directional input device, the magnet 109 has the through hole 109a at the central portion, the magnet holding portion 106 (or 206) includes the pair of disk portions 1060 (or 2060) and 1061 (or 2061) disposed at both ends of the magnet, and the pin 1062 (or 2062), the through holes 1060a (or 2060a) and 1061a (or 2061a) are provided at the central portions of the disk portions 1060 (or 2060) and 1061 (or 2061), and the magnet 109 is held between the disk portions 1060 (or 2060) and 1061 (or 2061) in a state where the pin 1062 (or 2062) is inserted into the through holes 1060a (or 2060a) and 1061a (or 2061a) and 109a of the disk portions 1060 (or 2060) and 1061 (or 2061) and the magnet 109. Therefore, when the outer diameter of the magnet 109 is increased, it is not necessary to increase the outer diameter of the magnet holding portion 106 accordingly, and the magnet 109 can be increased without increasing the size of the product, so that the detection accuracy of the tilting operation of the operating member 104 can be improved.

In the multi-directional input device, the magnet holding portion 106 (or 206 or 306) has the abutment surface 1063 (or 2063 or 3063) in a spherical segment shape on one surface opposite to the magnet 109 (or 209) side in one of the disk portions 1061 (or 2061 or 3061) opposite to the protruding direction of the operating member 104, the abutment surface 1063 (or 2063 or 3063) includes the flat surface 1063a (or 2063a or 3063a) formed of the small diameter side end surface of the spherical segment, and the curved surface 1063b (or 2063b or 3063b) formed of the side surface of the spherical segment, the operating member 104 is supported on the bottom plate portion 101a of the case 101 in an upright state together with the magnet holding portion 106 (or 206 or 306) in a state where the flat surface 1063a (or 2063a or 3063a) is in abutment against the bottom plate portion 101a, and the operating member 104 is supported on the bottom plate portion 101a in a tilted state together with the magnet holding portion 106 (or 206 or 306) in a state where the curved surface 1063b (or 2063b or 3063b) is in abutment against the bottom plate portion 101a.

In the multi-directional input device, the elastic member 107 is a compression coil spring disposed between the operating member 104 and the magnet holding portion 106 (or 206 or 306) and is configured to press the abutment surface 1063 (or 2063 or 3063) against the bottom plate portion 101a while biasing the operating member 104 in the protruding direction.

The multi-directional input device includes the rotating member 105 having the through hole 105a into which the operating member 104 is inserted, the rotating member 105 includes the first shaft portions 105b and 105c, the first shaft portions 105b and 105c are provided coaxially with one straight line orthogonal to the center line of the rotating member 105 in a state of protruding toward two opposite directions from the outer peripheral surface of the rotating member 105, the rotating member 105 is accommodated in the case 102 so as to be rotatable about the axes of the first shaft portions 105b and 105c, the operating member 104 includes the second shaft portions 104d and 104e, the second shaft portions 104d and 104e are provided coaxially with one straight line orthogonal to the center line of the operating member 104 and also orthogonal to the first shaft portions 105*b* and 105*c* in a state of protruding toward two opposite directions from the outer peripheral surface of the operating member 104, and the operating member 104 protrudes from the case 102 and can be tilted in any direction of the periphery in a state of being rotatably supported about the axes of the second shaft portions 104*d* and 104*e* with respect to the rotating member 105.

The multi-directional input device includes the pusher 111 accommodated in the case 102 in a state of being movable in the vertical direction, and the metal dome 113 which is a snap-type contact member for biasing the pusher 111 upward, and includes the pressing switch capable of detecting pressing of the operating member 104, the rotating member 105 is accommodated in the case 102 in a state of being movable downward along with pressing of the operating member 104, and the pressing switch is configured to cause the rotating member 105 that moves downward along with pressing of the operating member 104 to move the pusher 111 downward against the biasing force of the metal dome 113, and to press the metal dome 113 with the pusher 111.

In the multi-directional input device, the magnetic sensors 110A and 110B are arranged in a direction orthogonal to the protruding direction of the first shaft portions 105*b* and 105*c*, so that an appropriate distance (for example, a distance that is not too short and not too long) can be secured between the magnet 109 (or 209) and the magnetic sensors 110A and 110B, and the detection accuracy of the tilting operation of the operating member 104 can be improved.

What is claimed is:

1. A multi-directional input device comprising:
    a case;
    an operating member that protrudes from the case and can be tilted with respect to the case from an initial upright state to a tilted state;
    an elastic member that returns the operating member from the tilted state to the initial upright state;
    a magnet holding portion that is movable with respect to the operating member only in a direction along a protruding direction and is interlocked with the operating member only in a tilting direction;
    a magnet held by the magnet holding portion; and
    a first magnetic sensor and a second magnetic sensor which are each arranged at a respective position facing the magnet and each detect movements of the magnet,
    wherein the first magnetic sensor and the second magnetic sensor are each disposed on a respective side of the magnet and each can detect the movements of the magnet in three axial directions orthogonal to one another,
    wherein the first magnetic sensor and the second magnetic sensor are spaced at 180 degrees from each other about the magnet, and
    wherein an angle of a magnetic flux density vector obtained from an output value of the first magnetic sensor and an angle of a magnetic flux density vector obtained from an output value of the second magnetic sensor are averaged in an X-axis direction and a Y-axis direction to calculate a tilt angle of the operating member with respect to the case.

2. The multi-directional input device according to claim 1, further comprising a magnet tilt angle calculation unit which calculates a tilt angle of the magnet based on the output values of the first and second magnetic sensors.

3. The multi-directional input device according to claim 2, wherein the magnet holding portion includes:
    a pair of disk portions disposed at both ends of the magnet; and
    a pin which is located coaxially with the magnet and protrudes in a protruding direction of the operating member from one of the disk portions in the protruding direction of the operating member.

4. The multi-directional input device according to claim 3, wherein one of the disk portions has an abutment surface on a side opposite to the magnet and opposite to the protruding direction of the operating member,
    wherein the abutment surface includes a circular flat surface, and a curved surface surrounding the circular flat surface,
    wherein the operating member is supported in the initial upright state by the magnet holding portion being in a state where the circular flat surface is abutted against a bottom plate portion of the case, and
    wherein the operating member is supported in the tilted state by the magnet holding portion being in a state where the curved surface is abutted against the bottom plate portion.

5. The multi-directional input device according to claim 4, wherein the elastic member is a compression coil spring disposed between the operating member and the magnet holding portion and is configured to press the abutment surface against the bottom plate portion while biasing the operating member in the protruding direction.

6. The multi-directional input device according to claim 3, further comprising a rotating member arranged in the case and having a through hole into which the operating member is inserted,
    wherein the rotating member includes a first shaft portion and the operating member includes a second shaft portion,
    wherein the first shaft portion is provided coaxially with one straight line orthogonal to a center line of the rotating member, in a state of protruding toward two opposite directions from an outer peripheral surface of the rotating member,
    wherein the rotating member is accommodated in the case so as to be rotatable about an axis of the first shaft portion,
    wherein the second shaft portion is provided coaxially with one straight line orthogonal to the center line of the operating member and also orthogonal to the first shaft portion, in a state of protruding toward two opposite directions from the outer peripheral surface of the operating member, and
    wherein the operating member protrudes from the case and can be tilted in any direction of a periphery in a state of being rotatably supported about an axis of the second shaft portion with respect to the rotating member.

7. The multi-directional input device according to claim 6, further comprising a pressing switch capable of detecting a pressing of the operating member and including a pusher and a snap-type contact member, wherein:
    the pusher is accommodated in the case in a state of being movable in a vertical direction relative to the case;
    the snap-type contact member biases the pusher upward with a biasing force; and
    the pressing of the operating member causes the rotating member to move downward, which causes the pusher to move downward against the biasing force of the snap-type contact member, and to press the contact member downward.

8. The multi-directional input device according to claim 7, wherein the magnetic sensors are each disposed at a respective position that is point-symmetric with respect to a center line of the magnet.

9. The multi-directional input device according to claim 6, wherein the magnetic sensors are each disposed at a respective position that is point-symmetric with respect to a center line of the magnet.

10. The multi-directional input device according to claim 1, wherein the magnet holding portion includes:
   a pair of disk portions disposed at both ends of the magnet; and
   a pin which is located coaxially with the magnet and protrudes in a protruding direction of the operating member from one of the disk portions in the protruding direction of the operating member.

11. The multi-directional input device according to claim 10,
   wherein one of the disk portions has an abutment surface on a side opposite to the magnet and opposite to the protruding direction of the operating member,
   wherein the abutment surface includes a circular flat surface, and a curved surface surrounding the circular flat surface,
   wherein the operating member is supported in the initial upright state by the magnet holding portion being in a state where the circular flat surface is abutted against a bottom plate portion of the case, and
   wherein the operating member is supported in the tilted state by the magnet holding portion being in a state where the curved surface is abutted against the bottom plate portion.

12. The multi-directional input device according to claim 11, wherein the elastic member is a compression coil spring disposed between the operating member and the magnet holding portion and is configured to press the abutment surface against the bottom plate portion while biasing the operating member in the protruding direction.

13. The multi-directional input device according to claim 10, further comprising a rotating member arranged in the case and having a through hole into which the operating member is inserted,
   wherein the rotating member includes a first shaft portion and the operating member includes a second shaft portion,
   wherein the first shaft portion is provided coaxially with one straight line orthogonal to a center line of the rotating member, in a state of protruding toward two opposite directions from an outer peripheral surface of the rotating member,
   wherein the rotating member is accommodated in the case so as to be rotatable about an axis of the first shaft portion,
   wherein the second shaft portion is provided coaxially with one straight line orthogonal to the center line of the operating member and also orthogonal to the first shaft portion, in a state of protruding toward two opposite directions from the outer peripheral surface of the operating member, and
   wherein the operating member protrudes from the case and can be tilted in any direction of a periphery in a state of being rotatably supported about an axis of the second shaft portion with respect to the rotating member.

14. The multi-directional input device according to claim 13, further comprising a pressing switch capable of detecting a pressing of the operating member and including a pusher and a snap-type contact member, wherein:
   the pusher is accommodated in the case in a state of being movable in a vertical direction relative to the case;
   the snap-type contact member biases the pusher upward with a biasing force; and
   the pressing of the operating member causes the rotating member to move downward, which causes the pusher to move downward against the biasing force of the snap-type contact member, and to press the contact member downward.

15. The multi-directional input device according to claim 14, wherein the magnetic sensors are each disposed at a respective position that is point-symmetric with respect to a center line of the magnet.

16. The multi-directional input device according to claim 13, wherein the magnetic sensors are each disposed at a respective position that is point-symmetric with respect to a center line of the magnet.

* * * * *